United States Patent
Kubo

(10) Patent No.: US 10,321,016 B2
(45) Date of Patent: Jun. 11, 2019

(54) CONTROL APPARATUS, CONTROL METHOD, AND STORAGE MEDIUM FOR CONTROLLING A CONCAVO-CONVEX LAYER FORMING APPARATUS THAT FORMS A CONCAVO-CONVEX LAYER ON A PRINTING MEDIUM

(71) Applicant: CANON KABUSHIKI KAISHA, Tokyo (JP)

(72) Inventor: Hideki Kubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 15/510,376

(22) PCT Filed: Sep. 24, 2015

(86) PCT No.: PCT/JP2015/004840
§ 371 (c)(1),
(2) Date: Mar. 10, 2017

(87) PCT Pub. No.: WO2016/056193
PCT Pub. Date: Apr. 14, 2016

(65) Prior Publication Data
US 2017/0291427 A1 Oct. 12, 2017

(30) Foreign Application Priority Data
Oct. 7, 2014 (JP) .................. 2014-206443

(51) Int. Cl.
*G06K 9/52* (2006.01)
*B33Y 50/00* (2015.01)
(Continued)

(52) U.S. Cl.
CPC ............ *H04N 1/4092* (2013.01); *B33Y 50/00* (2014.12); *B33Y 50/02* (2014.12); *B41J 2/2054* (2013.01);
(Continued)

(58) Field of Classification Search
None
See application file for complete search history.

(56) References Cited

U.S. PATENT DOCUMENTS

| 7,097,279 B2 | 8/2006 | Konno |
| RE43,556 E | 7/2012 | Konno |
| 2003/0161520 A1 | 8/2003 | Yamano et al. |
| 2004/0207705 A1* | 10/2004 | Ozawa ................ B41J 2/01 347/101 |

(Continued)

FOREIGN PATENT DOCUMENTS

| CN | 101415559 A | 4/2009 |
| JP | 2001-260328 A | 9/2001 |

(Continued)

OTHER PUBLICATIONS

International Search Report & Written Opinion of Parent International Application No. PCT/JP2015/004840 dated Nov. 17, 2015.

(Continued)

*Primary Examiner* — Scott A Rogers
(74) *Attorney, Agent, or Firm* — Venable LLP

(57) ABSTRACT

A control apparatus for controlling a concavo-convex layer forming apparatus, includes at least one memory that stores instructions, and at least one processor coupled to the at least one memory, and configured to execute the instructions to cause the control apparatus to function as an input unit configured to input concavo-convex data representing a three-dimensional object, and a correction unit configured to perform correction on the input concavo-convex data in accordance with at least one frequency band of the input concavo-convex data and a filter having an intensity that is made higher for the input concavo-convex data having a greater amplitude on the input concavo-convex data.

14 Claims, 23 Drawing Sheets

(51) Int. Cl.
  B33Y 50/02    (2015.01)
  G06K 15/02    (2006.01)
  H04N 1/409    (2006.01)
  B41J 2/21     (2006.01)
  G06K 15/10    (2006.01)
  B41J 2/205    (2006.01)
  B29C 64/112   (2017.01)
  B29C 64/386   (2017.01)
  B29C 64/393   (2017.01)

(52) U.S. Cl.
  CPC ............ *B41J 2/2132* (2013.01); *G06K 9/527* (2013.01); *G06K 15/105* (2013.01); *G06K 15/1872* (2013.01); *B29C 64/112* (2017.08); *B29C 64/386* (2017.08); *B29C 64/393* (2017.08); *B41J 2/2121* (2013.01); *G06K 15/021* (2013.01)

(56) References Cited

U.S. PATENT DOCUMENTS

2016/0001549 A1* 1/2016 Kubo .................. B41J 2/04536
                                                        347/9

2017/0041479 A1* 2/2017 Kubo .................... B33Y 10/00

FOREIGN PATENT DOCUMENTS

| JP | 2004-299058 A | 10/2004 |
| JP | 2005-261563 A | 9/2005 |
| JP | 2008-126505 A | 6/2008 |
| JP | 2010-162801 A | 7/2010 |
| JP | 2011-024049 A | 2/2011 |

OTHER PUBLICATIONS

Extended European Search Report dated Jun. 1, 2018, issued in European Application No. 15849603.4.
Office Action dated Jun. 4, 2018, issued in Chinese Patent Application No. 201580053936.3.
Office Action dated Jun. 5, 2018, issued in Japanese Patent Application No. 2014-206443.
Office Action dated Mar. 4, 2019, issued in Chinese Patent Application No. 201580053936.3.

* cited by examiner

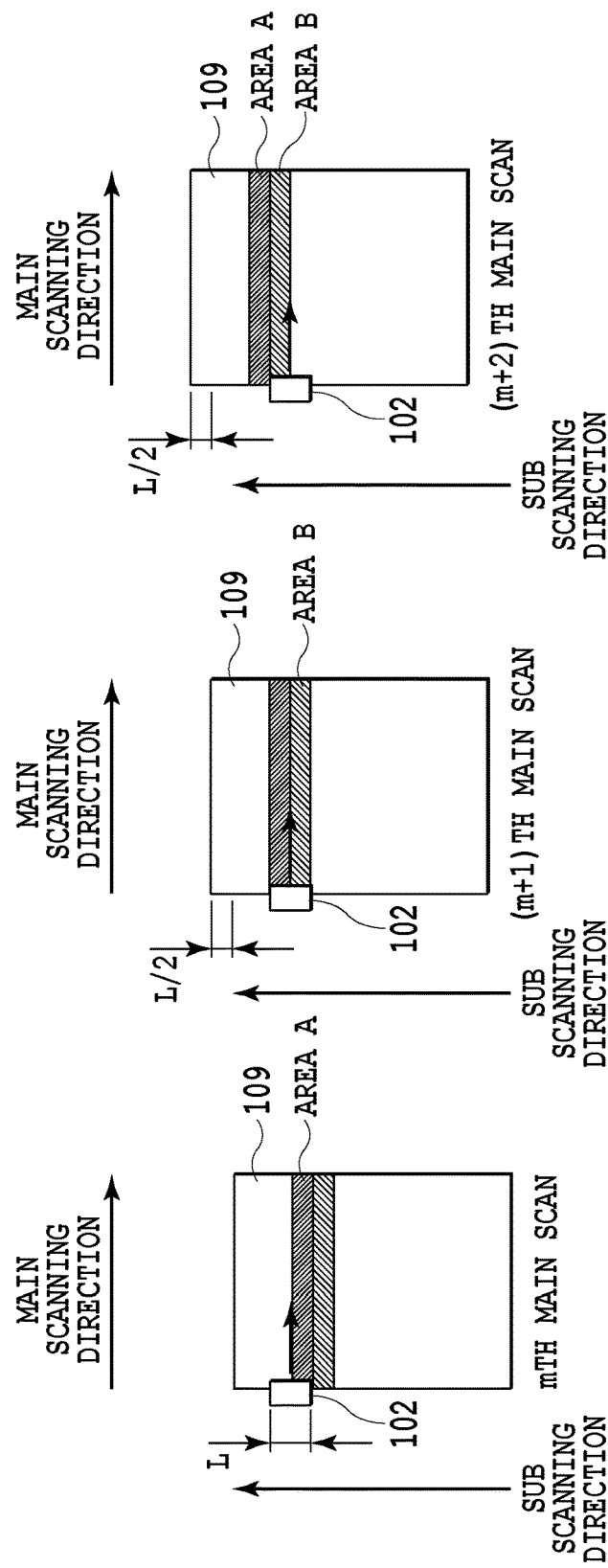

FIG.8A
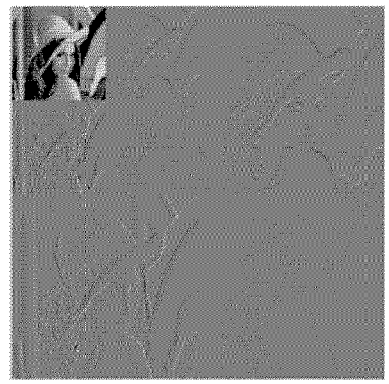
FIG.8B
FIG.8C
| LL | HL |
|----|----|
| LH | HH |

FIG.12A

| | x=0 | x=1 | x=2 | x=3 |
|---|---|---|---|---|
| y=0 | 90 | 30 | 90 | 30 |
| y=1 | 90 | 30 | 90 | 30 |
| y=2 | 90 | 30 | 90 | 30 |
| y=3 | 90 | 30 | 90 | 30 |

FIG.12B

|  | L | | H | |
|---|---|---|---|---|
|  | n=0 | n=1 | n=0 | n=1 |
| y=0 | 60 | 60 | 30 | 30 |
| y=1 | 60 | 60 | 30 | 30 |
| y=2 | 60 | 60 | 30 | 30 |
| y=3 | 60 | 60 | 30 | 30 |

← LOW FREQUENCY COMPONENT OF x=0, 1
← LOW FREQUENCY COMPONENT OF x=2, 3
← HIGH FREQUENCY COMPONENT OF x=0, 1
← HIGH FREQUENCY COMPONENT OF x=2, 3

FIG.12C

|  | LL | | HH | |
|---|---|---|---|---|
|  | n=0 | n=1 | n=0 | n=1 |
| m=0 | 60 | 60 | 30 | 30 |
| m=1 | 60 | 60 | 30 | 30 |
| m=0 | 0 | 0 | 0 | 0 |
| m=1 | 0 | 0 | 0 | 0 |

LH ... HH

↓ LOW FREQUENCY COMPONENT OF y=0, 1
↓ LOW FREQUENCY COMPONENT OF y=2, 3
↓ HIGH FREQUENCY COMPONENT OF y=0, 1
↓ HIGH FREQUENCY COMPONENT OF y=2, 3

FIG.12D

| 60 | 0 |
| 60 | 0 |

← LOW FREQUENCY COMPONENT OF n=0, 1
← HIGH FREQUENCY COMPONENT OF n=0, 1

↓ LOW FREQUENCY COMPONENT OF m=0, 1
↓ HIGH FREQUENCY COMPONENT OF m=0, 1

| | y=0 | y=1 | y=2 | y=3 |
|---|---|---|---|---|
| n=0 m=0 | 60 | 60 | 0 | 0 |
| n=1 m=1 | 60 | 60 | 0 | 0 |
| n=0 m=0 | 45 | 45 | 0 | 0 |
| n=1 m=1 | 45 | 45 | 0 | 0 |

FIG.13B

| | y=0 | y=1 | y=2 | y=3 |
|---|---|---|---|---|
| n=0 | 60 | 60 | 60 | 60 |
| n=1 | 60 | 60 | 60 | 60 |
| n=0 | 45 | 45 | 45 | 45 |
| n=1 | 45 | 45 | 45 | 45 |

FIG.13C

| | y=0 | y=1 | y=2 | y=3 |
|---|---|---|---|---|
| x=0 | 105 | 105 | 105 | 105 |
| x=1 | 15 | 15 | 15 | 15 |
| x=2 | 105 | 105 | 105 | 105 |
| x=3 | 15 | 15 | 15 | 15 |

CONTROL APPARATUS, CONTROL METHOD, AND STORAGE MEDIUM FOR CONTROLLING A CONCAVO-CONVEX LAYER FORMING APPARATUS THAT FORMS A CONCAVO-CONVEX LAYER ON A PRINTING MEDIUM

TECHNICAL FIELD

The present invention relates to a technique to form a concavo-convex layer and an image on a printing medium.

BACKGROUND ART

Conventionally, as a method for forming a desired concavo-convex layer or a three-dimensional object, a method for cutting a material using an engraving machine, or the like, and a method for stacking materials, such as a hardening resin and a gypsum, are known. In a case in which the concavo-convex layer or the three-dimensional object, such as a relief and a figure, formed in this manner is used for the purpose of viewing, or the like, the surface characteristics of the shape, such as a sharpness and a smoothness, greatly affect the appearance of the layer or the object to viewers and the viewers' impression.

Further, a method for forming an image by performing printing on a surface of a three-dimensional object is also known. For example, a method for printing an image in advance on a dedicated sheet by using a printing apparatus, such as an offset printing apparatus, and pasting the sheet onto the target three-dimensional object, a method for ejecting color materials directly to a three-dimensional object by using the ink jet printing system, etc., are known. In a case in which an image is formed on the surface of a three-dimensional object, as described above, the shape characteristics also greatly affect the appearance of the layer or the object to viewers and the viewers' impression.

In forming a concavo-convex layer and a three-dimensional object, a method for obtaining a hard copy that represents a stereoscopic effect and a texture by forming a concavo-convex layer and an image substantially at the same time by using the ink jet printing system has been proposed (Japanese Patent Laid-Open No. 2004-299058). With such a hard copy, there is a case in which a desired concavo-convex layer is not obtained due to the accuracy of an output apparatus and characteristics, such as the surface tension and wet spreading, of the material forming the concavo-convex layer.

As the main output characteristics of an apparatus, a Modulation Transfer Function (MTF) representing the response characteristics in accordance with an input frequency is widely known. As a typical example of the MTF characteristics, there is a deterioration of the response of the high-frequency component. This is a phenomenon in which, in a case in which a waveform having a certain difference in height is input, for example, a sinusoidal wave is input, at low frequencies, the same difference in height as that of the input is obtained, but as the frequency increases, the difference in height is reduced.

In a case in which such a phenomenon occurs, the sharpness of the surface of concavo-convex layer will be lost, and the way an output object appears will be greatly affected. Regarding this point, a technique to compensate for the MTF characteristics by applying filter processing to an image is known in the field of image processing. It is possible to expect to suppress a deterioration of a concavo-convex layer by similarly performing MTF correction in forming the concavo-convex layer.

Technical Problem

In a case in which the MTF characteristics of a concavo-convex layer forming apparatus change depending on, for example, the amount of amplitude of input data, the operation condition of the apparatus, etc., however, it is difficult to form a concavo-convex shape having good characteristics only by simply applying the MTF correction technique widely known in the image processing field.

SUMMARY OF THE INVENTION

Solution to the Problem

A concavo-convex layer forming apparatus according to the present invention includes an input unit configured to input concavo-convex data representing a concavo-convex layer of an object to be printed, and a correction unit configured to perform correction in accordance with a plurality of frequency bands of the input concavo-convex data and having an intensity that is made higher for the greater amplitude on the input concavo-convex data based on frequency response characteristics in a case in which the concavo-convex layer is formed on a printing medium.

Advantageous Effects of Invention

According to the present invention, it is made possible to represent a concavo-convex layer that is faithful to input concavo-convex data in concavo-convex layer forming processing.

Further features of the present invention will become apparent from the following description of exemplary embodiments with reference to the attached drawings.

BRIEF DESCRIPTION OF DRAWINGS

FIG. 4A is a diagram showing an example of two-path printing.

FIG. 4B is a diagram showing an example of two-path printing.

FIG. 4C is a diagram showing an example of two-path printing.

FIGS. 8A to 8C are diagrams for showing an example of the case in which input concavo-convex data is divided for each frequency band in a main scanning direction and in a sub-scanning direction by carrying out discrete wavelet transformation on the input concavo-convex data. In particular, FIG. 8A shows the original input data, and FIG. 8B shows the data obtained by transforming the original input data into frequency components in the main scanning direction and the sub-scanning direction, and FIG. 8C shows the frequency components for the main scanning direction and the sub-scanning direction.

FIG. 12A is a diagram explaining a specific example of wavelet transformation.

FIG. 12B is a diagram explaining a specific example of wavelet transformation.

FIG. 12C is a diagram explaining a specific example of wavelet transformation.

FIG. 12D is a diagram explaining a specific example of wavelet transformation.

FIG. 12E is a diagram explaining a specific example of wavelet transformation.

FIG. 12F is a diagram explaining a specific example of wavelet transformation.

FIG. 13A is a diagram showing a state after performing gamma correction processing on an HL component.

FIG. 13B is a diagram showing a state after performing gamma correction processing on an HL component.

FIG. 13C is a diagram showing a state after performing gamma correction processing on an HL component.

DESCRIPTION OF THE EMBODIMENTS

Hereafter, with reference to the attached drawings, the present invention is explained in detail in accordance with preferred embodiments. Configurations shown in the following embodiments are merely exemplary, and the present invention is not limited to the configurations shown schematically.

Embodiment 1

Figure 1:
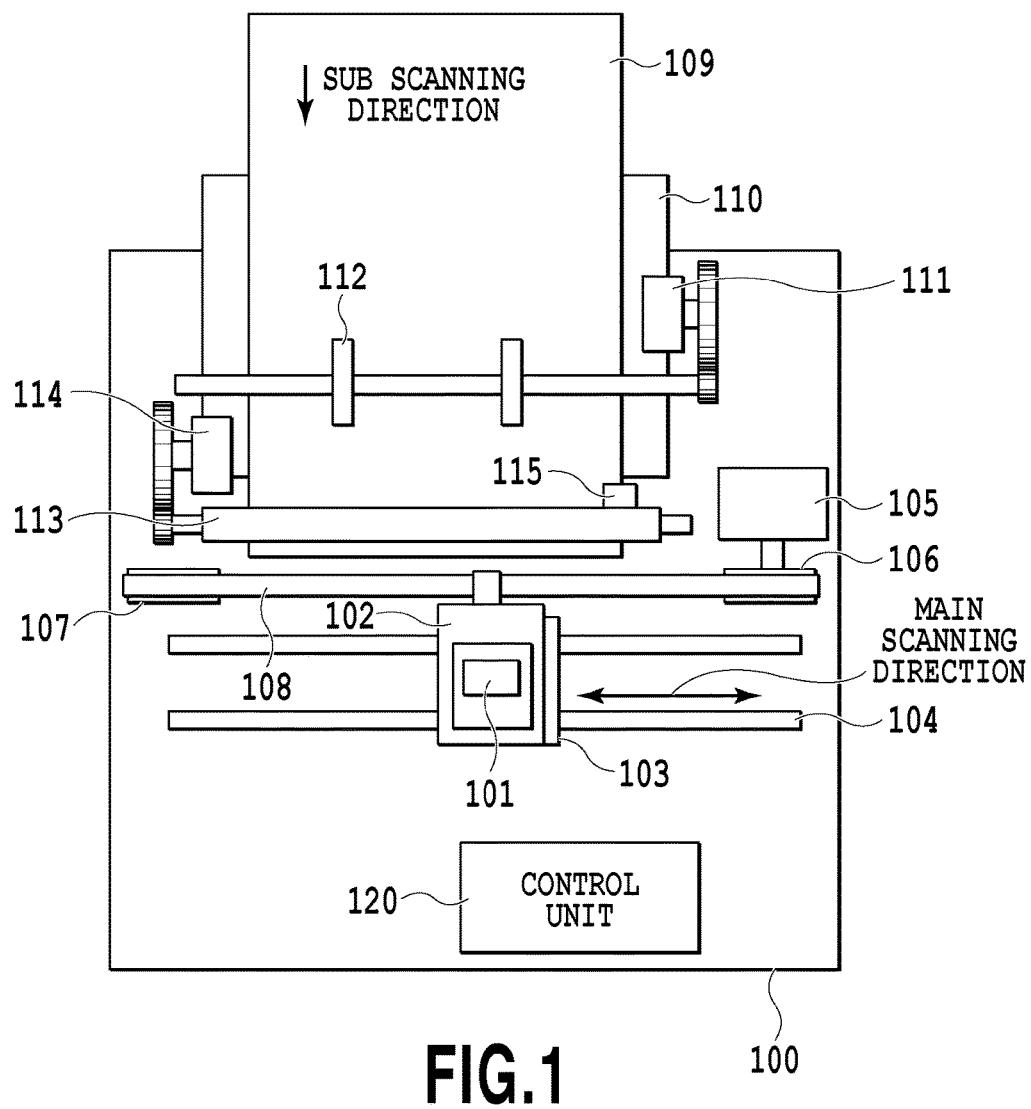
FIG. 1 is a diagram showing an outline configuration of an ink jet printing printer.

FIG. 1 is a diagram showing an outline configuration of an ink jet printing printer as a concavo-convex layer forming apparatus according to the present embodiment. Hereafter, a configuration for forming a concavo-convex layer and an image by using ink in a printer 100 is explained.

A head cartridge 101 has a printing head, including a plurality of ejection ports and ink tanks from which ink is supplied to the printing head, and is provided with connectors to receive a signal, or the like, to drive each ejection port of the printing head. As inks, there exist six kinds of inks in total, i.e., a liquid resin ink for forming a concavo-convex layer, and color inks, i.e., cyan, magenta, yellow, black, and white inks, for forming an image layer, and the ink tank for each ink is provided independently of other ink tanks.

The head cartridge 101 is exchangeably mounted on a carriage 102, and the carriage 102 is provided with a connector holder for transmitting a drive signal, or the like, to the head cartridge 101 via the connector. Further, on the carriage 102, an ultraviolet irradiation device 103 is mounted, and the ultraviolet irradiation device 103 is controlled so as to harden and to fix the ejected hardening ink on a printing medium.

The carriage 102 is configured so as to be capable of reciprocating along a guide shaft 104. Specifically, the carriage 102 is driven via drive mechanisms, such as a motor pulley 106, a driven pulley 107, and a timing belt 108, by using a main scan motor 105 as a drive source, and, at the same time, the position and the movement of the carriage 102 are controlled. The movement of the carriage 102 along the guide shaft 104 is referred to as a "main scan" and the movement direction is referred to as a "main scanning direction". A printing medium 109, such as a printing sheet, is placed on an auto sheet feeder (ASF) 110. At the time of printing an image, a pickup roller 112 rotates via a gear by the drive of a paper feed motor 111, and the printing medium 109 is separated one by one from the ASF 110 and is fed. Further, the printing medium 109 is conveyed to a printing starting position in opposition to the ejection port surface of the head cartridge 101 on the carriage 102 by the rotation of a conveyance roller 113. The conveyance roller 113 is driven via a gear by using a line feed (LF) motor 114 as a drive source. Determination of whether or not the printing medium 109 is fed and the settlement of the position at the time of paper feed are performed at the point in time that the printing medium 109 passes by a paper end sensor 115. The head cartridge 101 mounted on the carriage 102 is held so that the ejection port surface protrudes downward from the carriage 102 and becomes parallel to the printing medium 109.

A control unit 120 includes a central processing unit (CPU), storage units, including a read-only memory (ROM), and random access memory (RAM), a hard disk drive (HDD), etc., and various interfaces (I/Fs), among other things, and receives concavo-convex data and image data from an external device, and controls the operation of each unit of the printer 100 based on the received data.

Concavo-Convex Layer and Image Printing Operation

Subsequently, formation of a concavo-convex layer and an image in the ink jet printing printer 100 with the configuration shown in FIG. 1 is explained.

First, after the printing medium 109 is conveyed to a predetermined printing starting position, the carriage 102 moves on the printing medium 109 along the guide shaft 104 and ink is ejected from the ejection port of the printing head at the time of the movement. The ultraviolet irradiation device 103 irradiates the ejected ink with ultraviolet light to harden and to fix the ink on the printing medium 109 in accordance with the movement of the printing head. Then, after the carriage 102 moves up to one end of the guide shaft 104, the conveyance roller 113 conveys the printing medium 109 by a predetermined amount in the direction perpendicular to the scanning direction of the carriage 102. The conveyance of the printing medium 109 is referred to as "paper feed" or "sub-scan" and the conveyance direction is referred to as a "paper feed direction" or a "sub-scanning direction". After the conveyance of the printing medium 109 by a predetermined amount is completed, the carriage 102 moves again along the guide shaft 104. By repeating the scan by the carriage 102 of the printing head and the paper feed in this manner, a concavo-convex layer is formed on the entire surface of the printing medium 109. After the concavo-convex image is formed, the conveyance roller 113 returns the printing medium 109 to the printing starting position and an image is formed on the concavo-convex layer by the same process as that of the concavo-convex layer formation. For simplification, explanation is given on the assumption that the concavo-convex layer and the image are formed separately, as described above, but it may also be possible to perform processing in which the printing medium 109 is not returned by controlling the order of the ink kinds that are ejected in each scan so that an image layer is formed on the concavo-convex layer.

Figure 2:
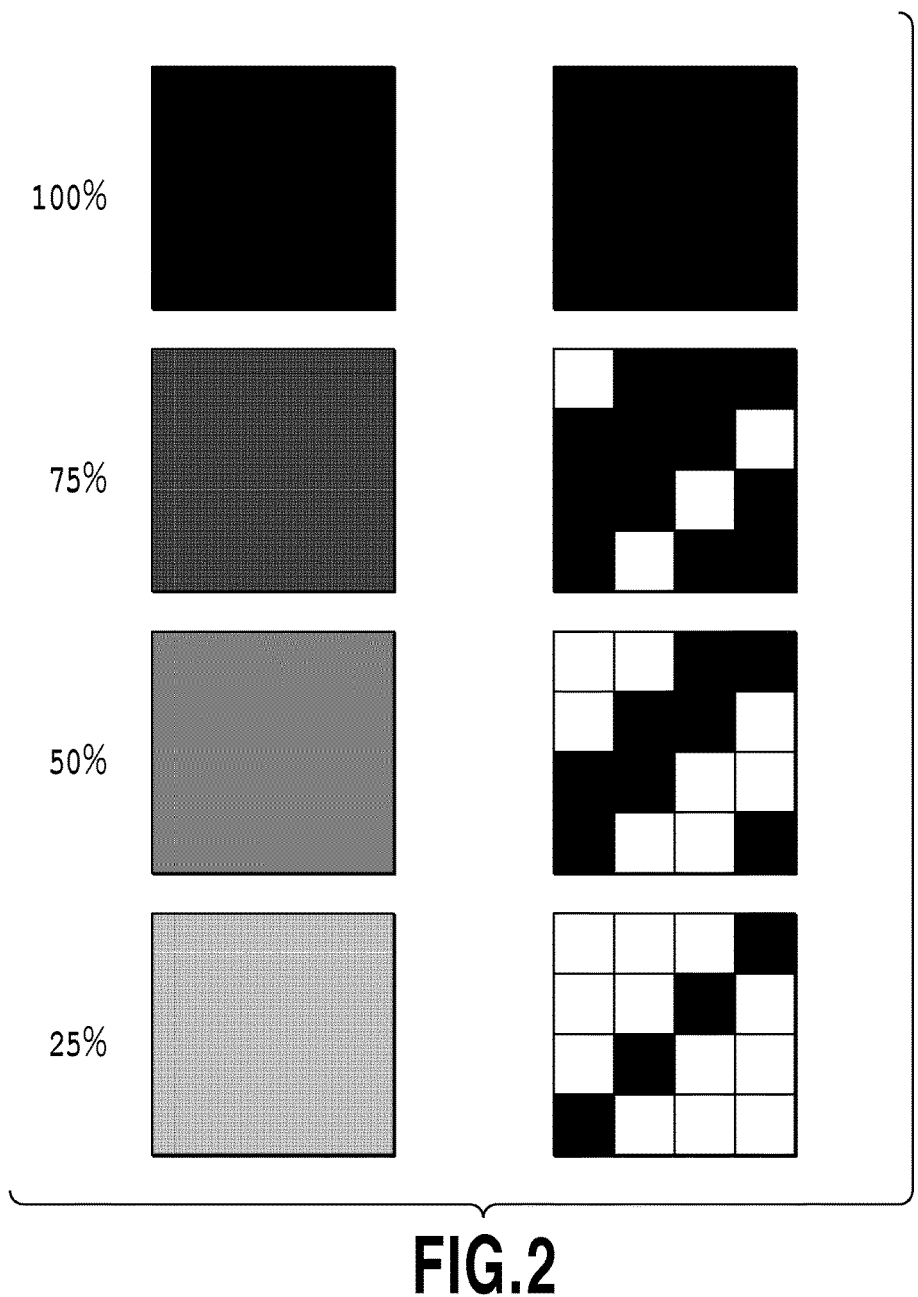
FIG. 2 is a schematic diagram explaining a gradation representation of an image by an area gradation method.

FIG. 2 is a schematic diagram explaining a gradation representation of an image by an area gradation method. Basically, the printing head is represented by binary control, i.e., whether or not an ink droplet is ejected. In the present embodiment, it is assumed that on/off of ink (i.e., whether ink is ejected/not ejected) is controlled for each pixel that is defined by the output resolution of the printer 100 and a state in which ink is on in all the pixels in a unit area is handled as an ink amount of 100%. With such a so-called binary printer, it is possible for a single pixel to represent only one of 100% and 0%, and, therefore, a halftone is represented by a set of a plurality of pixels. In the example in FIG. 2, a halftone at a density of 25% shown at the bottom left in FIG. 2 is represented by ejecting ink to four pixels among 4×4 pixels (16 pixels in total), which means 4/16=25% in terms of area, as shown at the bottom right in FIG. 2. It is also possible to represent another tone level similarly. The total number of pixels, the pattern of pixels in which ink is on, etc., for representing a halftone are not limited to those in the above-described example. In order to determine a pattern of pixels in which ink is on, for example, the error diffusion processing or the like is used frequently.

In the concavo-convex layer formation of the present embodiment, the height is controlled for each position by using a concept of the ink amount described previously. In a case in which a substantially uniform layer is formed with an ink amount of 100% in the concavo-convex layer formation, in accordance with the volume of the ejected ink, the formed layer has a certain thickness (i.e., a height). For example, in a case in which a layer formed with an ink amount of 100% has a thickness of 20 μm, in order to reproduce a thickness of 100 μm, it is necessary to stack the layer five times. In other words, the ink amount that is ejected to the position where a height of 100 μm is necessary is 500%.

Figure 3B:
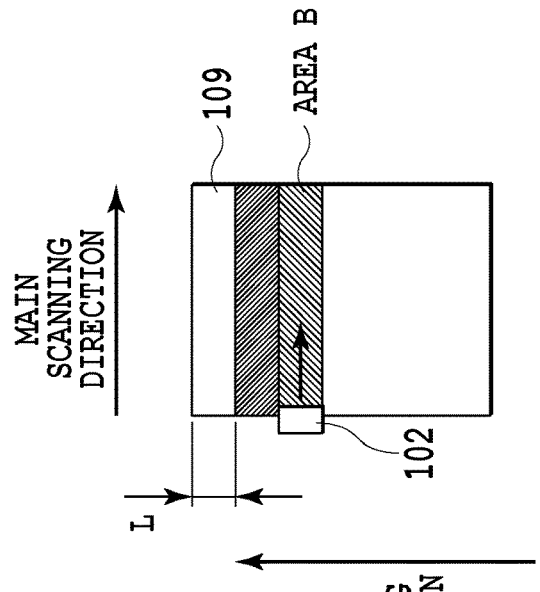
FIG. 3B is a diagram explaining an operation to form a concavo-convex object or an image by a printing head scanning on a printing medium.
Figure 3A:
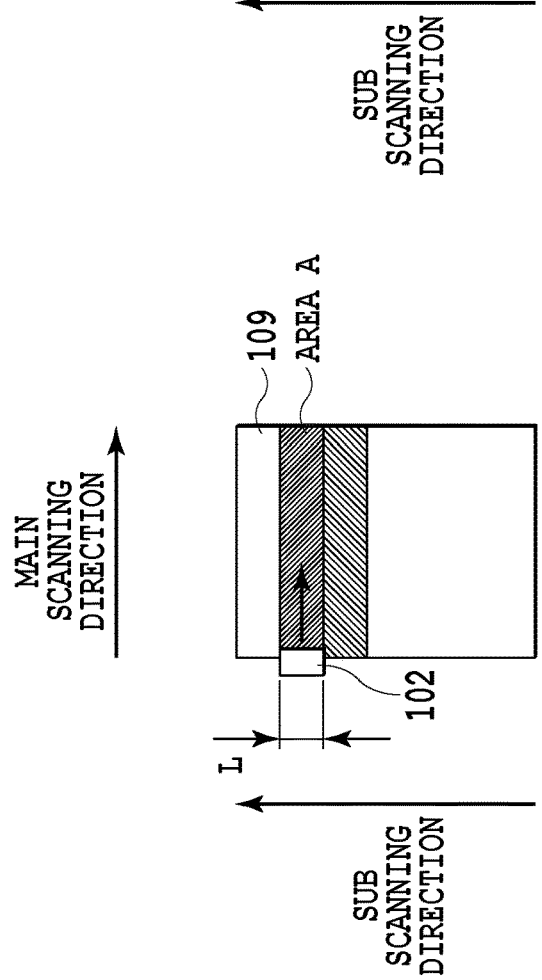
FIG. 3A is a diagram explaining an operation to form a concavo-convex object or an image by a printing head scanning on a printing medium.

FIG. 3A and FIG. 3B are diagrams explaining the operation to form a concavo-convex layer or an image by the printing head scanning on the printing medium 109.

In the main scan by the carriage 102, an image is printed by an amount corresponding to a width L of the printing head, and each time printing of one line is completed, the printing medium 109 is conveyed by the distance L in the sub-scanning direction. In order to simplify explanation, it is assumed that it is possible for the printer 100 in the present embodiment to eject ink up to an ink amount of 100% in a single scan and, in a case in which the concavo-convex layer, for which the ink amount exceeding 100% is necessary, is formed, conveyance is not performed and the same area is scanned a plurality of times. For example, in a case in which the ink amount that is ejected is 500% at the maximum, the same line is scanned five times. This is explained with reference to FIG. 3A and FIG. 3B, as follows. After an area A is scanned by the printing head five times (FIG. 3A), the printing medium 109 is conveyed by the distance L in the sub-scanning direction and the main scan of an area B is repeated five times (FIG. 3B).

There is a case in which the scan is performed a plurality of times, i.e., so-called multi-path printing is performed for an ink amount of 100% or less in order to suppress a deterioration of image quality, such as a variation in period, resulting from the accuracy of the printing head. FIG. 4A to FIG. 4C are diagrams showing an example of two-path printing. In the example in FIG. 4A to FIG. 4C, an image is printed by an amount corresponding to the width L of the printing head in the main scan by the carriage 102, and each time printing of one line is completed, the printing medium 109 is conveyed by the distance L/2 in the sub-scanning direction. The area A is printed by the mth main scan (FIG. 4A) and the (m+1)th main scan (FIG. 4B) of the printing head, and the area B is printed by the (m+1)th main scan (FIG. 4B) and the (m+2)th main scan (FIG. 4C) of the printing head. Here, the two-path printing is explained, but it is possible to change the number of paths in accordance with the image quality required for an image to be printed and the accuracy of the concavo-convex layer to be formed. In the case in which n-path printing is performed, for example, each time printing of one line is completed, the printing medium 109 is conveyed by the distance L/n in the sub scanning direction. At this time, even in the case in which the ink amount is 100% or less, the pattern is divided into a plurality of printing patterns and a concavo-convex layer or an image is formed by the printing head performing the main scan n times on the same line of the printing medium 109.

In the present embodiment, in order to avoid a confusion between the scan by the above-described multi-path printing and the scan to eject ink an ink amount of 100% or more, explanation is given on the assumption that the multi-path printing is not performed and a plurality of scans is performed in order to stack layers. The printing medium 109 to which the present invention can be applied is not limited in particular, and various materials, such as paper and plastic film, can be used as long as the printing head can print an image on the printing medium 109.

Figure 5:
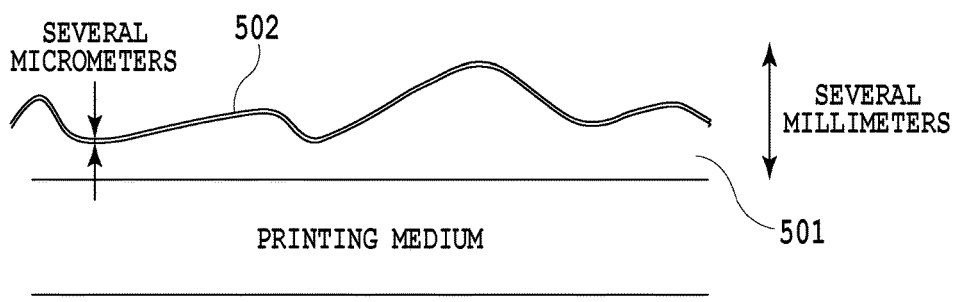
FIG. 5 is a diagram showing a section of a concavo-convex layer and an image layer formed on a printing medium.

FIG. 5 is a diagram showing a section of a concavo-convex layer 501 and an image layer 502 generated on the printing medium 109. The present embodiment is described on the assumption that an image layer 502 is formed on the surface of a concavo-convex layer 501 having a height distribution that includes a height of up to about several millimeters. To be strict, the image layer 502 also has a height distribution, but the thickness is about several micrometers, and, therefore, the influence on the final concavo-convex layer 501 will be slight, and, therefore, ignorable. As a matter of course, it may also be possible to perform processing to correct the height data, or the like, by taking into consideration the thickness distribution of the image layer 502.

Change in Response Characteristics of Concavo-Convex Layer

FIG. 6A to FIG. 6F are diagrams showing examples of input/output characteristics of the printer 100 as a concavo-convex layer forming apparatus. In FIG. 6A to FIG. 6F, the solid line indicates the input side and the broken line indicates the output side.

Figure 6A:
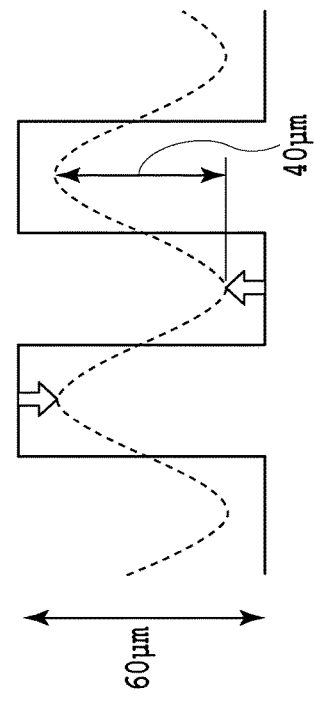
FIG. 6A is a diagram showing an example of input/output characteristics of a printer.
Figure 6B:
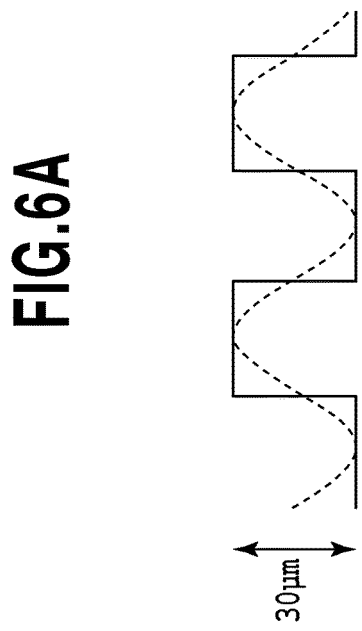
FIG. 6B is a diagram showing an example of input/output characteristics of a printer.
Figure 6C:
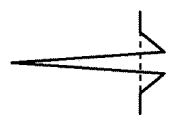
FIG. 6C is a diagram showing an example of input/output characteristics of a printer.

FIG. 6A shows response characteristics for a rectangular wave for alternately forming three dots and three spaces with a resolution of 600 dots per inch (DPI), i.e., an input signal having a period of 100 lines per inch (lpi) and for forming a stripe pattern. While the input signal (solid line) is a rectangular wave having an amplitude of 30 µm, the shape of the output signal (broken line) is dulled and seems like a sinusoidal wave. Such dullness of the output signal is caused by the characteristics, such as the surface tension and wet spreading, of the material forming the concavo-convex layer. As a technique to compensate for such characteristics, the correction processing, such as filter processing to perform edge enhancement, is known. FIG. 6C shows a relationship between the input and output before and after the correction processing in the case in which the dullness of the output signal shown in FIG. 6A is corrected. FIG. 6E and FIG. 6F show the characteristics (shape) of the filter used in the correction processing. The difference in amplitude between FIG. 6E and FIG. 6F indicates a difference in intensity of the correction, and the intensity is higher in FIG. 6F compared to that in FIG. 6E. Compared to the rectangular input signal (solid line) before correction in FIG. 6C, the shape of the output signal (broken line) is dulled due to the above-described response characteristics, but, after correction, it is possible to obtain a substantially rectangular response due to edge enhancement by the filter having the characteristics in FIG. 6E and FIG. 6F described above. Such a deterioration phenomenon of a signal changes depending on the frequency, and normally, the deterioration is less serious in the lower-frequency area and the deterioration becomes more serious in the higher-frequency area. As previously noted, such frequency response characteristics are generally called an MTF. Then, offsetting the deterioration by giving opposite characteristics of the MTF in advance to the input signal is called MTF correction, and it is possible to represent the response characteristics for a plurality of frequencies as one filter. In the general image processing, the MTF correction is performed widely by using one filter for the entire surface of an image.

In a case in which a concavo-convex layer forming apparatus, such as the printer 100, is used, however, the frequency response characteristics change considerably depending on the amplitude value of the input signal. FIG. 6B shows response characteristics for a rectangular wave for alternately forming three dots and three spaces with a resolution of 600 dpi, as shown in FIG. 6A, and also shows a state in which the amplitude of the input signal (solid line) is doubled and becomes 60 µm. In FIG. 6A, the amplitude of the response, which is the output signal, is 30 µm, which is the same as that of the input signal, but in FIG. 6B, the amplitude of the input signal, which is 60 µm, is not reproduced and the amplitude of the output signal is about 40 µm.

In a case in which it is assumed that the MTF characteristics do not change depending on the amplitude, it is expected that doubling the amplitude of the input signal will also double the amplitude of the output signal. In the case of the concavo-convex layer forming apparatus, such as the printer 100, however, as a result of the characteristics, or the like, of the material forming the concavo-convex layer, the greater the amplitude, the more serious the deterioration becomes. The reason may be that the greater the amplitude (i.e., the deeper the concave part), the more likely it becomes that the ink that should be piled up on the top of a convex part of the concavo-convex layer falls into a concave part of the concavo-convex layer.

Figure 7A:
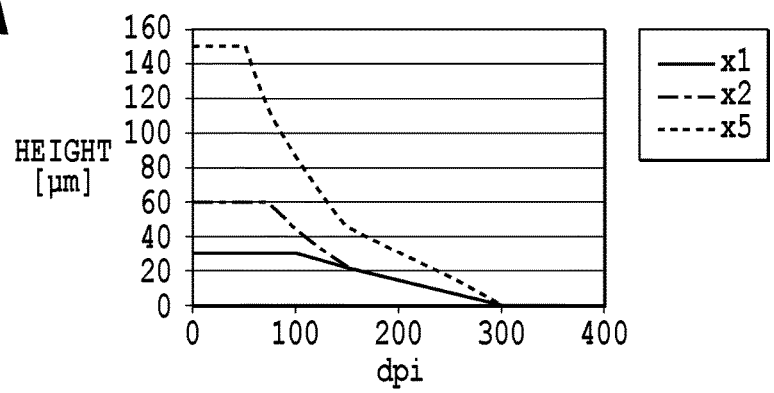
FIG. 7A is a graph representing response characteristics for input signals having different amplitudes and frequencies.
Figure 7B:
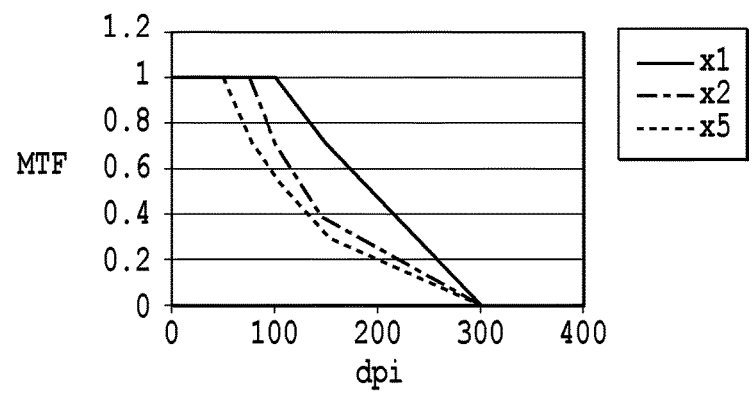
FIG. 7B is a graph representing response characteristics for input signals having different amplitudes and frequencies.
Figure 7C:
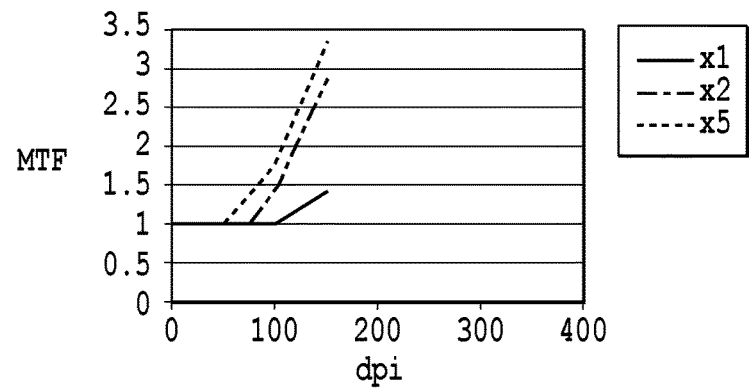
FIG. 7C is a graph representing response characteristics for input signals having different amplitudes and frequencies.

FIG. 7A to FIG. 7C are graphs representing response characteristics for input signals having different amplitudes and frequencies. FIG. 7A shows the amplitude values of the responses in a case in which sinusoidal waveforms having amplitude heights of 30 µm, 60 µm, and 150 µm, respectively, are input. The thickness of one layer of an ink amount of 100% is 30 µm, and, therefore, the response characteristics are for the amplitudes corresponding to one, two, and five layers in terms of the number of layers. FIG. 7B represents the response characteristics as a ratio of the amplitude of the output to that of the input, showing the so-called MTF characteristics. From FIG. 7B, it can be understood that the response characteristics change in accordance with the amount of amplitude. For example, by focusing attention on the response characteristics of 100 dpi, it is known that, in the case of a comparatively low amplitude of one layer, the response is 100%, but, in the case of two layers, the response is only about 70%, and, in the case of five layers, the response is only about 50%. FIG. 7C shows the MTF characteristics of a filter for compensating for the three kinds of MTF characteristics, respectively, shown in FIG. 7B. In a case in which the filter with each of the MTF characteristics shown in FIG. 7C is applied in advance to the input concavo-convex data in each output apparatus having each of the MTF characteristics shown in FIG. 7B, the output results will be the product of the MTF characteristics of the output apparatus and the MTF characteristics of the filter. For example, by multiplying the output characteristics of one layer indicated by the solid line in FIG. 7B by the MTF characteristics of the filter for compensating for those indicated by the solid line in FIG. 7C, the characteristics that MTF=1 in any frequency band, i.e., there is no change between the input and the output, are obtained. This relationship is also the same for two layers and five layers.

As explained above, it is not possible to perform appropriate correction even by performing the MTF correction by using a single piece of the filter processing on the concavo-convex layer forming apparatus having output characteristics that change depending on both elements of the frequency and the amplitude.

Figure 6D:
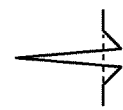
FIG. 6D is a diagram showing an example of input/output characteristics of a printer.
Figure 6E:
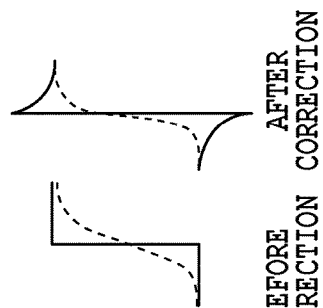
FIG. 6E is a diagram showing an example of input/output characteristics of a printer.
Figure 6F:
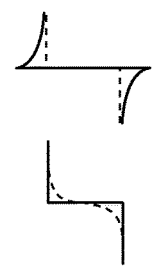
FIG. 6F is a diagram showing an example of input/output characteristics of a printer.

FIG. 6D shows the relationship between the input and the output before and after the correction processing in the case in which the correction is performed on the input signal (FIG. 6B) having an amplitude that is doubled and becomes 60 μm by using the filter with the characteristics shown in FIG. 6E. It is known that it is not possible to perform sufficient correction in the case in which the amplitude is doubled even by using the filter with which the ideal response (see FIG. 6C) can be obtained on a condition that the amplitude value is small.

In the present embodiment, the correction is performed based on the frequency and amplitude in view of the characteristics of the concavo-convex layer forming apparatus, as described above.

FIG. 8A to FIG. 8C are diagrams showing an example in which discrete wavelet transformation is carried out on the input concavo-convex data, and the input concavo-convex data is divided for each frequency band in the main scanning direction and in the sub-scanning direction. FIG. 8A shows the original input data and FIG. 8B shows the data (signal) obtained by transforming the original input data into the frequency components shown in FIG. 8C. In FIG. 8C, LL denotes the signal of the low frequency components both in the main scanning direction and in the sub-scanning direction, HL denotes the signal of the high frequency component in the main scanning direction, LH denotes the signal of the high frequency component in the sub-scanning direction, and HH denotes the signal of the high frequency components both in the main scanning direction and in the sub-scanning direction. For the signal corresponding to LL in FIG. 8C, it is possible to further carry out the same transformation and to divide the signal into lower frequency components. As described above, by the wavelet transformation, it is possible to divide the input signal into signals of a plurality of frequency bands.

Here, focusing attention on the signal of the portion corresponding to HL in FIG. 8B reveals that the intensity for each position of the high-frequency component of the original input signal is represented by a density. This indicates that the intensity of the frequency component is high in the position close to white or black (the amplitude value of the frequency component is high) in the input data shown in FIG. 8A.

Figure 9A:
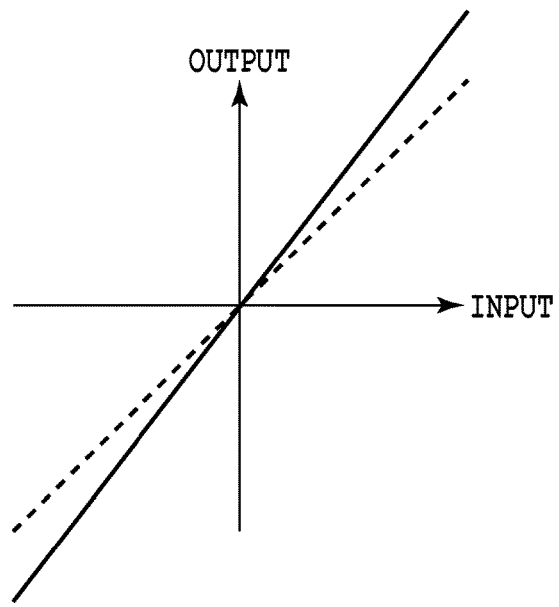
FIG. 9A is a diagram explaining gamma transformation.
Figure 9B:
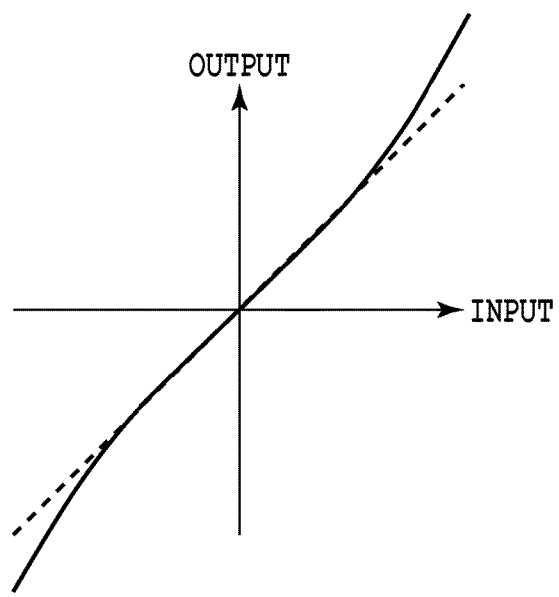
FIG. 9B is a diagram explaining gamma transformation.

Here, attention is focused on a specific frequency band. For example, it is supposed that transformation with the gamma characteristics (gamma transformation) as shown in FIG. 9A is carried out on the signal of HL. The gamma characteristics shown in FIG. 9A are obtained by multiplying the input signal by a uniform coefficient. This means that correction is performed with a fixed coefficient regardless of the amplitude value of the corresponding frequency component and is almost equivalent to the application of the above-described filter to the entire signal regardless of the amount of amplitude for each position. On the contrary to this, in the case in which the transformation with the gamma characteristics shown in FIG. 9B is applied, correction is not performed in the position in which the signal is close to "0" (the amplitude of the corresponding frequency component is small), and it is made possible to obtain an effect of increasing the intensity of correction in the position in which the amplitude becomes large.

Figure 10:
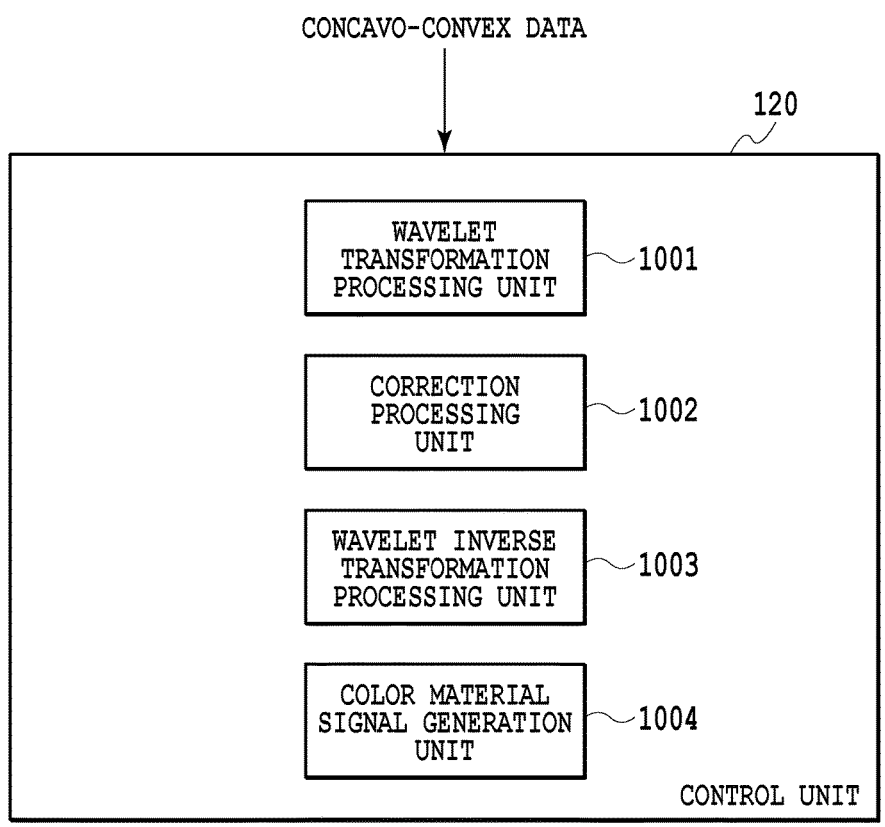
FIG. 10 is a function block diagram showing an internal configuration of a control unit.

Subsequently, details of the control unit 120 according to the present embodiment, which enables correction processing in accordance with a change in the MTF characteristics of the printer 100, are explained. FIG. 10 is a function block diagram showing an internal configuration of the control unit 120. The control unit 120 according to the present embodiment includes a wavelet transformation processing unit 1001, a correction processing unit 1002, a wavelet inverse transformation processing unit 1003, and a color material signal generation unit 1004.

The wavelet transformation processing unit 1001 carries out discrete wavelet transformation on the input concavo-convex data. Here, the concavo-convex data is data representing a set of height information for each of the coordinates x and y, and it is assumed that the concavo-convex data is represented by I (x, y). As described previously, by the wavelet transformation, it is possible to divide an input signal into signals corresponding to a plurality of frequency bands. In the present embodiment, the input concavo-convex data is divided into signals corresponding to a plurality of frequency bands by carrying out the discrete wavelet transformation.

The correction processing unit 1002 performs correction processing based on the concavo-convex signal of each frequency and the amount of amplitude. In other words, by performing correction processing on each signal of each frequency into which the concavo-convex data is divided by the wavelet transformation, the correction processing in accordance with the frequency of the concavo-convex data is enabled.

The wavelet inverse transformation processing unit 1003 carries out wavelet inverse transformation on a group of concavo-convex signals of each frequency band obtained by the correction processing. Due to this, a concavo-convex signal that has integrated each frequency band and in which the correction processing is reflected is generated.

The color material signal generation unit 1004 generates a color material signal (hereinafter, an ink signal) specifying the amount of color material (in the present embodiment, the ink amount) for each pixel based on the integrated concavo-convex signal after the correction processing.

Based on the ink signal generated as described above, the concavo-convex layer is formed on the printing medium.

Figure 11:
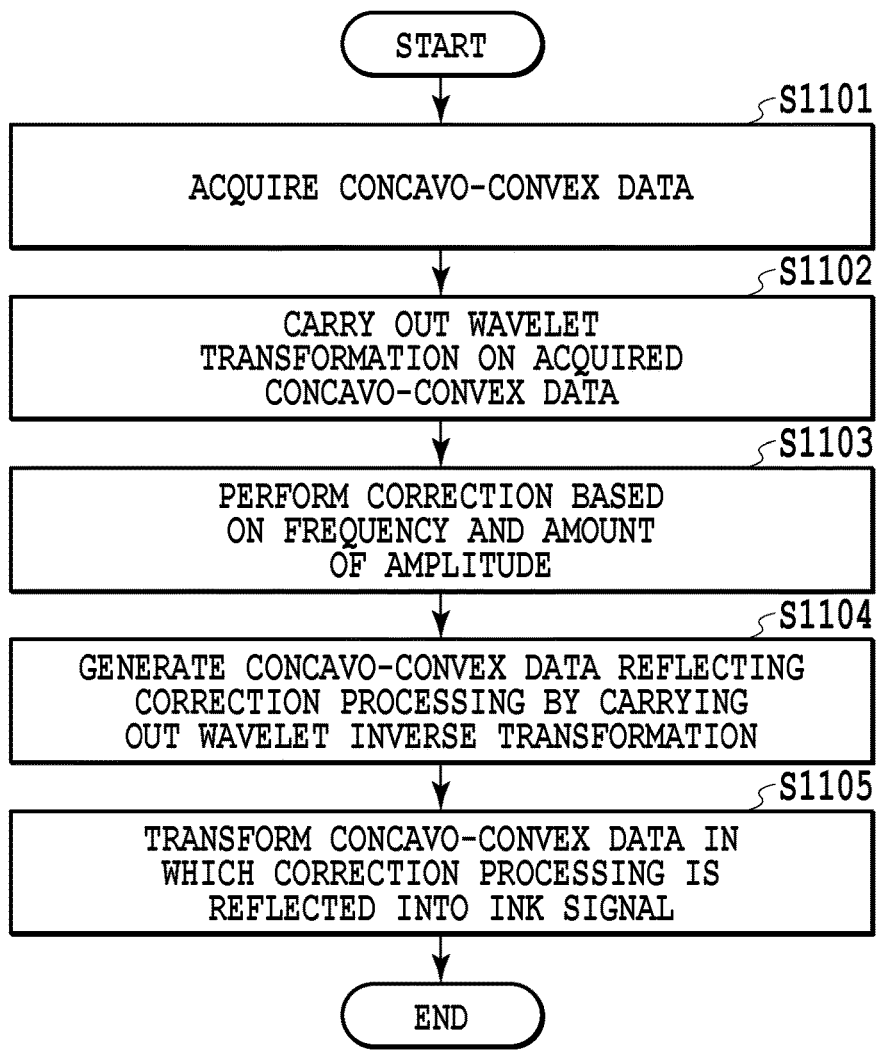
FIG. 11 is a flowchart showing details of each piece of processing in the control unit on a time-series basis.

FIG. 11 is a flowchart showing details of each piece of the processing in the above-described control unit 120 on a time-series basis. The series of processing is implemented by the CPU within the control unit 120 executing programs stored in the ROM, or the like, after loading the programs onto the RAM.

At step S1101, the control unit 120 acquires the concavo-convex data I (x, y). The acquired concavo-convex data I (x, y) is sent to the wavelet transformation processing unit 1001.

At step S1102, the wavelet transformation processing unit 1001 carries out the above-described wavelet transformation on the received concavo-convex data. As described previously, by the wavelet transformation, it is possible to divide the input signal into signals corresponding to a plurality of frequency bands. In the present embodiment, by carrying out the discrete wavelet transformation on the concavo-convex data, the input concavo-convex data is divided into signals corresponding to a plurality of frequency bands.

Specifically, first, a low frequency component L in the main scanning direction is found for each y coordinate by expression (1) below:

$$L(n)=(I(2n)+I(2n+1))/2 \qquad \text{expression (1)}.$$

Here, n is a natural number and, by the above-described expression (1), the average value of successive points is found as a result. By averaging successive points, the high frequency component is eliminated, and it is possible to extract the low frequency component.

Subsequently, a high frequency component H in the main scanning direction is found for each y coordinate by expression (2) below:

$$H(n)=I(2n)-I(2n+1) \quad \text{expression (2).}$$

By the above-described expression (2), the difference between successive points is found as a result. By calculating the difference, it is possible to extract the edge component, i.e., the high frequency component.

Further, by applying the same processing also in the sub-scanning direction, it is possible to transform the input concavo-convex data into signals corresponding to each component of LL, LH, HL, and HH described in FIG. 8C described previously, and each is expressed by expression (3) to expression (6) below:

$$LL(m)=(L(2m)+L(2m+1))/2 \quad \text{expression (3),}$$

$$LH(m)=(L(2m)-L(2m+1))/2 \quad \text{expression (4),}$$

$$HL(m)=(H(2m)+H(2m+1))/2 \quad \text{expression (5), and}$$

$$HH(m)=(H(2m)-H(2m+1))/2 \quad \text{expression (6).}$$

In the above-described expressions (3) to (6), m is a natural number. Then, by recursively performing the same processing on the obtained LL, it is possible to extract the signals in accordance with a plurality of frequency bands. At this step, the processing to divide the frequency band is repeated until the necessary low frequency component is obtained. In the following, it is assumed that each frequency component obtained by the recursive processing, such as the processing described above, is given the number of times of processing and, for example, in a case in which HH is further obtained for the above-described LL, the frequency component is denoted as HH2, and so on. Hereafter, with reference to FIG. 12A to FIG. 12F, a specific example of wavelet transformation is explained. FIG. 12A shows part (4×4 pixels) of the input concavo-convex data I (x, y). Each value indicates the height in each coordinate, in units of μm, forming a vertical stripe having a two-pixel period. FIG. 12B shows a state after the concavo-convex data in FIG. 12A is transformed into the low frequency component L and the high frequency component H for each y coordinate by the above-described expression (1) and expression (2). FIG. 12C shows a state after the data in FIG. 12B is further transformed into the low frequency component and the high frequency component for each column. Here, it is known that the value that indicates the height is "60" by focusing attention on LL (n=0, m=1) in FIG. 12C. This is a value representing the characteristics of the four pixels in total, which is a combination of 2n=0 and 2n+1=1 of the x coordinates corresponding to n=0, and 2m=2 and 2m+1=3 of the y coordinates corresponding to m=1, and is equivalent to the average height (90+30+90+30)/4=60. HL (n=0, m=1) is also a value representing the characteristics of the four pixels in total of the coordinates x=0, 1 and y=2, 3 as described previously, but is not an average. That is, the value of HL (n=0, m=1) indicates that the amplitude of the vertical stripe having a two-pixel period in the main scanning direction is ±30. Further, LH indicates the amount of amplitude of the horizontal stripe having a two-pixel period in the sub-scanning direction and HH indicates the amount of amplitude of the grating stripe having a two-pixel period in the main and sub-scanning directions, respectively. The concavo-convex data shown in FIG. 12A is a vertical stripe pattern, and, therefore, a value exists in HL in FIG. 12C, but the value of LH and HH is "0".

It is possible to further divide LL into the low frequency and high frequency components. FIG. 12D shows LL in FIG. 12C divided into the low frequency and high frequency components in the main scanning direction, and FIG. 12E shows LL in FIG. 12D transformed into LL2, HL2, LH2, and HH2 by dividing LL into the low frequency and high frequency components in the sub-scanning direction. Here, HL2, LH2, and HH2 are the vertical stripe component having a four-pixel period in the main scanning direction, the horizontal stripe component having a four-pixel period in the sub-scanning direction, and the grating stripe component having a four-pixel period in the main and sub-scanning directions, respectively. In this example, there is no pattern having a four-pixel period, and, therefore, each value is "0". FIG. 12F shows HL, LH, HH, HL2, LH2, HH2, and LL2 arranged side by side. In FIG. 12A to FIG. 12F, in order to simplify explanation, the example of 4×4 pixels is shown, but it is also possible to perform the same processing on an image that is larger than 4×4 pixels. By repeating the processing such as the processing described above, it is possible to divide the input concavo-convex data into vertical, horizontal, and diagonal components having a power-of-two-pixel period, such as 2, 4, 8, 16, etc. The concavo-convex data divided into the concavo-convex signal of each frequency band by the above-described wavelet transformation is sent to the correction processing unit 1002.

At step S1103, the correction processing unit 1002 performs correction processing by determining the intensity of a filter to be used (see FIG. 6E and FIG. 6F) based on each amount of amplitude in the concavo-convex signal of each frequency band. Specifically, the correction processing with the gamma characteristics as shown in FIG. 9B is applied to the concavo-convex signal of each frequency band. This is expressed by expression (7) as follows:

$$\text{Sig'}=\Gamma(\text{Sig}) \quad \text{expression (7).}$$

Here, Sig denotes the concavo-convex signal of each frequency band, such as LL, LH, HL, HH, LH2, HL2, etc., and F denotes a function to perform correction in accordance with the amplitude of the concavo-convex signal of each frequency band. The gamma characteristics used here mean the amount of correction in accordance with the amount of amplitude. For example, in the examples shown in FIG. 6A to FIG. 6F, described previously, in FIG. 6A, for the input signal having an amplitude of 30 μm, the response having an amplitude of 30 μm is obtained, but, in FIG. 6B, for the input signal having an amplitude of 60 μm, the response has an amplitude of only 40 μm, i.e., about 2/3 of 60 μm. As described previously, in the concavo-convex signal of each frequency band, the amplitude of the input concavo-convex is small in the area close to "0" and the amplitude becomes greater as the distance from "0" becomes greater. Here, it is assumed that the gamma characteristics that are applied are the characteristics that the coefficient is 1.0 in a case in which the amount of amplitude in terms of height is between 0 μm and 30 μm, and the coefficient increases gradually as the amount of amplitude increases from 30 μm, and the coefficient reaches 1.5 when the amount of amplitude is 60 μm. In a case in which the gamma characteristics are applied to the concavo-convex signal having a period of 100 lpi, as shown in FIG. 6A to FIG. 6F, the corrected value does not change and remains at 30 μm for the input signal having an amplitude of 30 μm, and, therefore, the amplitude of the response of the concavo-convex forming apparatus is also 30 μm. On the other hand, the corrected value for the input signal having an amplitude of 60 μm is 90 μm, i.e., 1.5 times 60 μm, where 1.5 is an input ratio. In this case, 90 μm, which is the corrected value, is input to the concavo-convex layer forming apparatus, but the responsiveness becomes low, i.e., about 2/3 of the original responsiveness, as the amplitude value increases, and, therefore, it is made possible to obtain a response close to 60 μm, which is the amplitude of the input value. As described above, by performing nonlinear correction in accordance with each frequency and the amplitude value, it is made possible to form the desired concavo-convex layer. The above-described gamma characteristics are held, for example, by transforming the response characteristics of the concavo-convex layer forming apparatus, which are obtained by measurement, or the like, performed in advance, into a Lookup Table (LUT). In this manner, the correction processing in accordance with the intensity of the concavo-convex signal is performed. The concavo-convex signal of each frequency band on which the correction processing has been performed is sent to the wavelet inverse transformation processing unit 1003.

At step S1104, the wavelet inverse transformation processing unit 1003 carries out wavelet inverse transformation (inverse transformation of the wavelet transformation carried out at step S1102) on a group of concavo-convex signals of each frequency band on which the correction processing has been performed, as shown expression (8) to expression (11) below:

$$L'(2m)=LL'(m)+LH'(m) \quad \text{expression (8),}$$

$$L'(2m+1)=LL'(m)-LH'(m) \quad \text{expression (9),}$$

$$H'(2m)=HL'(m)+HH'(m) \quad \text{expression (10), and}$$

$$H'(2m+1)=HL'(m)-HH'(m) \quad \text{expression (11).}$$

Then, the concavo-convex data after the correction processing, which has integrated each frequency band, is generated. A concavo-convex signal O after the correction is expressed by expression (12) and expression (13) below:

$$O(2n)=L'(n)+H'(n) \quad \text{expression (12), and}$$

$$O(2n+1)=L'(n)-H'(n) \quad \text{expression (13).}$$

In the above-described expression (8) to expression (13), 2m corresponds to the even row of the y coordinate, 2m+1 to the odd row of the y coordinate, 2n to the even column of the x coordinate, and 2n+1 to the odd column of the x coordinate.

FIG. 13A shows a state after the gamma correction processing has been performed on the HL component in FIG. 12C described previously. HL in FIG. 12C shows that the amplitude having a two-pixel period is ±30 μm, i.e., 60 μm, in each area in the image. Here, it is assumed that for the correction of a pattern having a two-pixel period and an amplitude of 60 μm, the correction 1.5 times the original correction is necessary. Because of this, in the gamma correction processing, the value "30" stored in HL corresponding to a two-pixel period is transformed into "45" by multiplying the value by 1.5. The data on which the gamma correction has been performed in this manner is transformed into the concavo-convex data corresponding to the xy coordinates. FIG. 13B shows the results of transforming the data in FIG. 13A into data corresponding to the y coordinate by the above-described inverse transformation processing. Further, FIG. 13C shows the results of returning the data in FIG. 13B to the concavo-convex data corresponding to the xy coordinates by the above-described inverse transformation processing. As shown in FIG. 13C, it is known that the vertical stripe component having a two-pixel period is made 1.5 times as large as the original one and is transformed into the vertical stripe having an amplitude of 90 μm by the gamma correction processing and the inverse transformation processing.

As described above, by performing the gamma correction on the concavo-convex data after the wavelet transformation, it is made possible to perform the correction processing in accordance with the amplitude value of a specific frequency component.

At step S1105, the color material signal generation unit 1004 generates the above-described ink signal based on a concavo-convex signal O (x, y) after the correction in which each frequency band has been integrated. Specifically, by expression (14) below, an ink amount O' (x, y) for each pixel is found:

$$O'(x,y)=O(x,y)/k \quad \text{expression (14)}$$

Here, k is a coefficient indicating the height per unit ink amount and a value in accordance with the ink amount to be ejected, the hardening condition, etc., is determined in advance and is held in the HDD, or the like. For example, in a case in which the height per ink amount of 100% is 20 μm (k=20), on a condition that the height of the input concavo-convex signal is 105 μm, 105/20=5.25, and, therefore, an ink amount of 525% is ejected to the corresponding coordinates, and the concavo-convex layer is formed as a result. In addition to this, it is also possible to calculate the ink amount by, for example, holding the ink amount necessary to reproduce the concavo-convex height as a table.

Then, in accordance with the ink signal generated as described above, the concavo-convex layer is formed on a printing medium and the normal printing processing is further performed on the formed concavo-convex layer where necessary.

As described above, by performing the correction processing based on the frequency band and amplitude of the concavo-convex data, it is made possible to perform correction different in intensity in accordance with the amplitude for each position of each frequency.

In the present embodiment, the basic function that is used for the wavelet transformation is the Haar function, but it may also be possible to use another basic function, such as the Franklin function.

In the present embodiment, the wavelet transformation is applied to the whole of the concavo-convex signal, but it may also be possible to calculate the frequency and the amount of amplitude and to make use of a spatial filter that meets those characteristics by performing multiplication with the wavelet obtained by performing scaling for each local area of the concavo-convex signal. By applying such local processing to the whole of the concavo-convex signal, it is possible to obtain the same effect as that of the present embodiment.

In the present embodiment, explanation is given by taking an ultraviolet hardening ink jet system as an example of the system for forming the concavo-convex layer, but the system is not limited to this type of system.

According to the present embodiment, by performing correction based on the frequency and amplitude of the concavo-convex data, it is possible to form a favorable concavo-convex shape.

Embodiment 2

In Embodiment 1, the aspect is explained in which correction is performed in accordance with the frequency and the amount of amplitude of the concavo-convex data. Here, the method that uses concavo-convex data divided so as to correspond to each scan, i.e., so-called slice data, at the time of forming the concavo-convex layer by using a stacking process is well known.

Next, an aspect is explained as Embodiment 2 in which a deterioration of a concavo-convex shape is suppressed simply and easily in the case in which the concavo-convex layer is formed by using the slice data. Explanation of the portions in common to those of Embodiment 1 (the basic configuration and operation of the concavo-convex layer forming apparatus) is omitted or simplified and, in the following description, different points are explained mainly.

Figure 14:
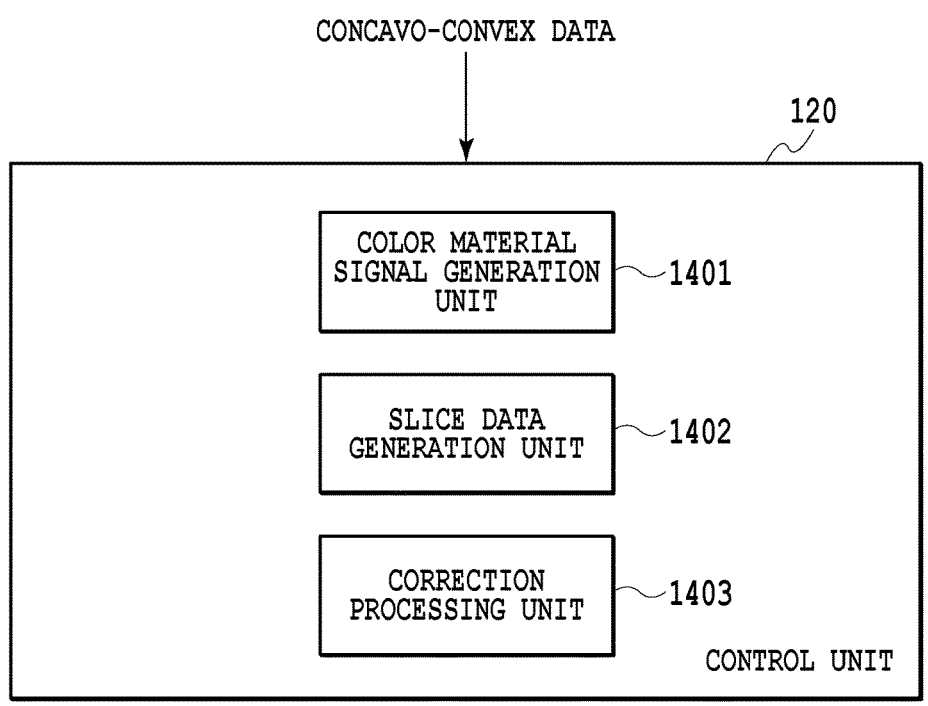
FIG. 14 is a function block diagram showing an internal configuration of the control unit.

Details of the control unit 120 according to the present embodiment are explained. FIG. 14 is a function block diagram showing an internal configuration of the control unit 120 in the present embodiment. The control unit 120 according to the present embodiment includes a color material signal generation unit 1401, a slice data generation unit 1402, and a correction processing unit 1403.

The color material signal generation unit 1401 corresponds to the color material signal generation unit 1004 in Embodiment 1. In the case of the present embodiment, the concavo-convex signal is transformed into a color material signal (ink signal) specifying the amount of color material (ink amount) for each pixel based on the concavo-convex signal before correction processing. The method for transforming the concavo-convex signal into the ink signal is the same as that explained in Embodiment 1.

The slice data generation unit 1402 generates slice data, which is data specifying the ink amount for each scan in the concavo-convex layer formation, from the above-described ink signal. To each piece of slice data, a scan number n (n is a natural number that is equal to or greater than 1) for identifying the number of a scan in which the slice data is used (formation order) is given.

The correction processing unit 1403 corresponds to the correction processing unit 1002 in Embodiment 1. In the correction processing unit 1403 of the present embodiment, the correction processing is performed on each piece of slice data by applying a filter with an intensity corresponding to the above-described scan number. Normally, in a case in which the scan number n is small, a filter with a low correction intensity is applied, and, in a case in which the scan number n is large, a filter with a high correction intensity is applied. In other words, the degree of edge enhancement becomes greater for the upper layer that is formed later in the formation order of slice data. The reason the wording "normally" is used is that there is a phenomenon in which the height responsiveness of a general printer becomes lower in a case in which the input signal has a high frequency and a large amplitude, but, in a case in which the amplitude is too large, there is almost no height responsiveness even by performing any correction. In this case, a stable response will not be obtained by correction with a high intensity and the correction with a high intensity will lead to an undesirable influence, such as a cause of noise, and, therefore, there is a case in which the amount of correction is limited or the correction itself is not performed.

Figure 15:
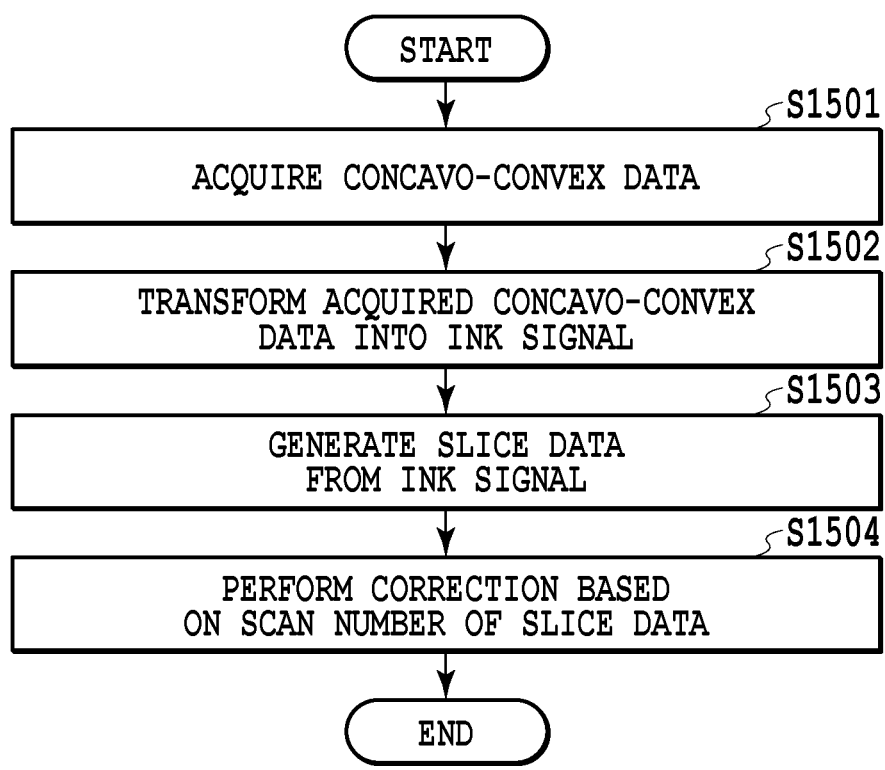
FIG. 15 is a flowchart showing a flow of processing in the control unit.

FIG. 15 is a flowchart showing a flow of the processing in the control unit 120 according to the present embodiment.

At step S1501, the control unit 120 acquires the concavo-convex data I (x, y). The acquired concavo-convex data I (x, y) is sent to the color material signal generation unit 1401.

At step S1502, the color material signal generation unit 1401 transforms the received concavo-convex data into an ink signal. The generated ink signal is sent to the slice data generation unit 1402.

Figure 16B:
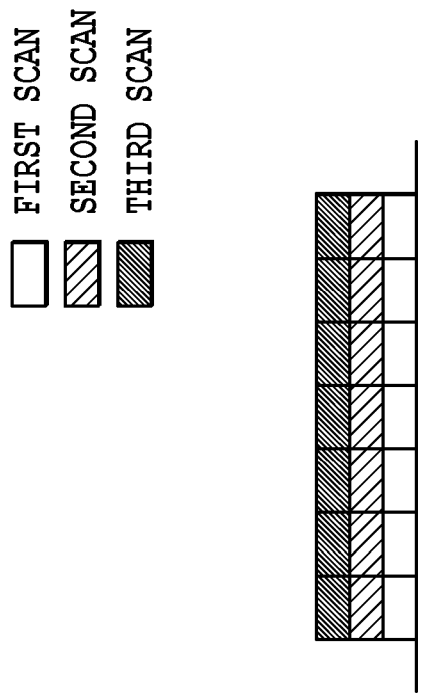
FIG. 16B is a diagram showing a relationship between input concavo-convex data and slice data.
Figure 16A:
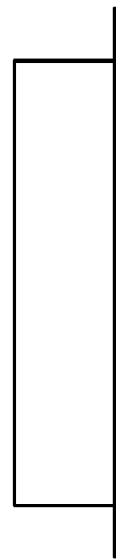
FIG. 16A is a diagram showing a relationship between input concavo-convex data and slice data.

At step S1503, the slice data generation unit 1402 generates the above-described slice data based on the received ink signal. FIG. 16A and FIG. 16B are diagrams showing a relationship between the input concavo-convex data and the slice data that is generated at this step. FIG. 16A shows a section view of the input concavo-convex data and FIG. 16B shows a section view of the slice data equally divided into three pieces of data with the same thickness in each coordinate. As described previously, it is supposed that the slice data shown in FIG. 16B is used in different scans. In the present embodiment, because modulation using a filter is performed in the subsequent correction processing, the thickness of each piece of slice data is made less than the maximum thickness that can be formed by a single scan. In other words, each piece of slice data is divided so as to have a thickness corresponding to a value smaller than an ink amount of 100%, for example, an ink amount of 75%. In this example, the ink amount per layer is 75%, and, therefore, the total ink amount is 225%. Then, the slice data is used in the order from the slice data corresponding to the lowermost layer in FIG. 16B and the concavo-convex layer is formed on the printing medium 109. In the example in FIG. 16B, the slice data in the lowermost layer is formed by the first scan, that in the next layer is formed by the second scan, and that in the uppermost layer is formed by the third scan. In the following, it is assumed that slice data corresponding to the scan number n is denoted by Sn.

At step S1504, the correction processing unit 1403 performs the correction processing on the generated slice data by using a filter having the MTF characteristics corresponding to the scan number n. Slice data S'n after the correction processing is expressed by expression (15) below:

$$S'n = Sn * fn \qquad \text{expression (15).}$$

Figure 17B:
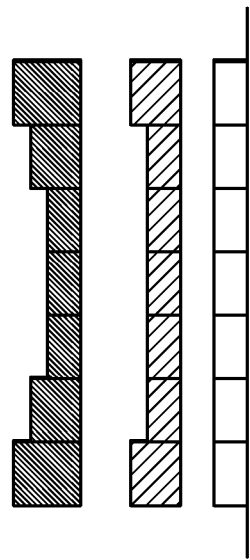
FIG. 17B is a diagram explaining an effect of correction processing.
Figure 17A:
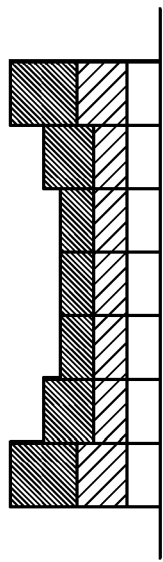
FIG. 17A is a diagram explaining an effect of correction processing.

In the above-described expression (15), "*" denotes a convolution integration. FIG. 17A and FIG. 17B are diagrams explaining the effect of the correction processing in the present embodiment. FIG. 17A is a diagram showing the slice data for each layer after the correction processing is performed on the slice data shown in FIG. 16B. As described above, it is known that the degree of edge enhancement becomes greater toward the upper layers as the results of applying a filter with a low correction intensity in the case in which the scan number n is small and applying a filter with a high correction intensity in the case in which the scan number n is great. FIG. 17B is a diagram showing a state in which slice data corresponding to the three layers after the correction processing shown in FIG. 17A is stacked.

Then, the scan based on the slice data generated as described above is performed, the concavo-convex layer is formed on the printing medium 109, and further, the normal printing processing is performed on the formed concavo-convex layer where necessary. By applying a filter different in intensity to each piece of slice data, it is made possible to perform correction different in intensity in accordance with the height and frequency for each position of the concavo-convex data.

In Embodiment 1, it is explained that the halftone representation of the thickness of the layer uses the area gradation, but, as a matter of course, it is also possible to make use of multivalued control by using a modulation droplet printing head capable of modulating the ink amount to be ejected through each nozzle.

According to the present embodiment, it is possible to form a preferred concavo-convex shape also in a case in which the concavo-convex layer is formed by using so-called slice data.

Embodiment 3

Next, an aspect is explained as Embodiment 3, in which correction is performed by taking into consideration a relative positional relationship between the printing head of the concavo-convex layer forming apparatus, the printing medium 109, and the surface of concavo-convex layer being formed. Explanation of the portions in common to those of Embodiment 1 and Embodiment 2 (basic configuration and operation of the concavo-convex layer forming apparatus) is omitted or simplified and, in the following description, different points are explained mainly.

Figure 18:
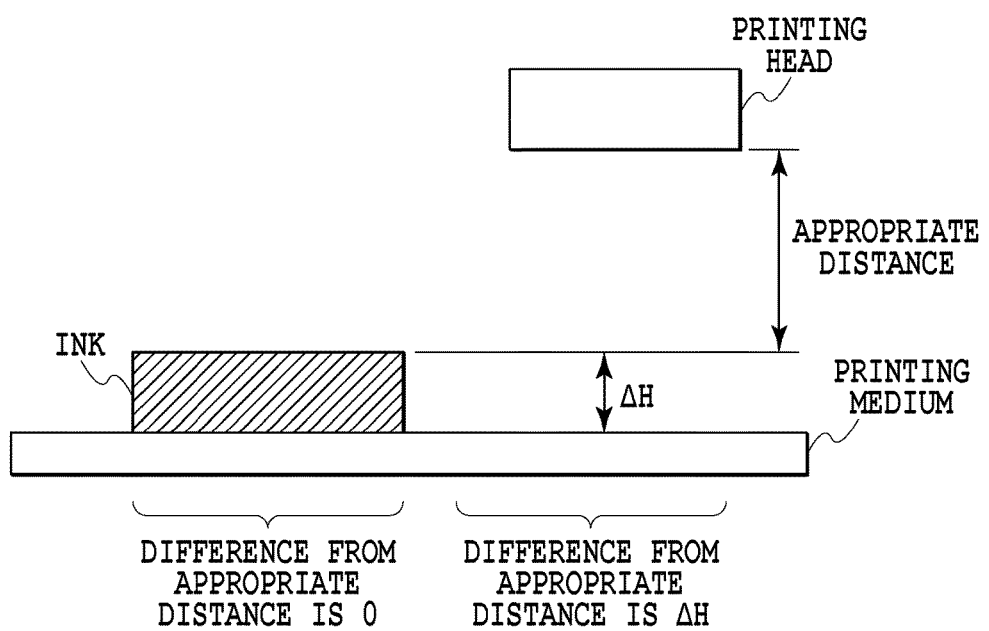
FIG. 18 is a schematic diagram showing a positional relationship between a printing head, a printing medium, and the surface of already ejected ink.

FIG. 18 is a schematic diagram showing a positional relationship between the printing head, the printing medium 109, and the surface of already ejected ink. In a case in which an ink jet printer is used for forming the concavo-convex layer, it is important that the distance from the printing head up to the printing medium 109 is appropriate. For example, in a case in which the distance is too short, the printing head comes into contact with the printing medium 109, resulting in a failure of the apparatus and a stain and damage to the printed matter. On the contrary, in a case in which the distance is too great, due to the influence of an air flow, or the like, it is no longer possible to keep the accuracy of the ink droplet impact position, or the ink droplet does not stick to the printing medium 109, but scatters within the apparatus. In the example shown in FIG. 18, the distance between the area to which the ink has already stuck and the printing head is an appropriate distance and the printing medium 109 to which no ink has stuck is spaced from the appropriate distance by a distance (or a different) ΔH. Normally, in the area at the appropriate distance, the MTF does not deteriorate so much, and the greater the distance ΔH from the appropriate distance, the more the MTF deteriorates due to the error in the impact position. In other words, the MTF characteristics change in accordance with the distance between the printing head and the ink impact surface.

In the present embodiment, the MTF correction is performed based on the distance ΔH from the appropriate distance in order to compensate for such a change in MTF characteristics.

Figure 19:
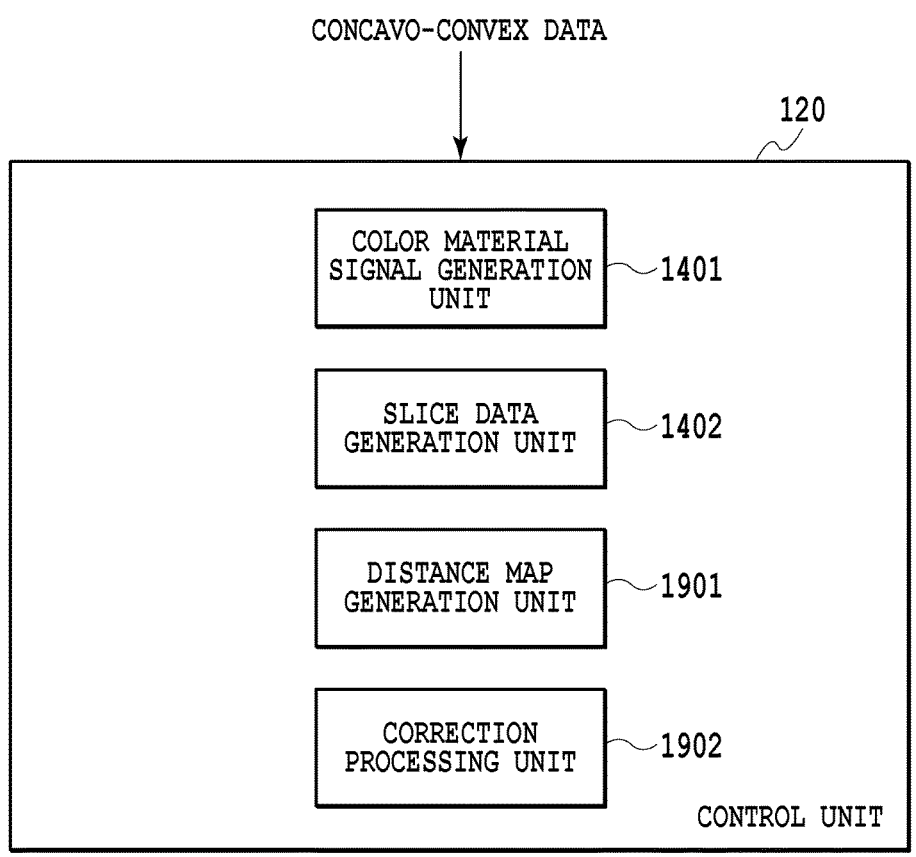
FIG. 19 is a function block diagram showing an internal configuration of the control unit.

Details of the control unit 120 according to the present embodiment are explained. FIG. 19 is a function block diagram showing an internal configuration of the control unit 120 in the present embodiment. The control unit 120 according to the present embodiment includes the color material signal generation unit 1401, the slice data generation unit 1402, a distance map generation unit 1901, and a correction processing unit 1902.

The color material signal generation unit 1401 and the slice data generation unit 1402 are the same as those explained in Embodiment 2.

The distance map generation unit 1901 generates information (hereafter, distance map) indicating the distance between the printing head and the ink impact surface (the surface of the printing medium 109 in the first layer and the surface (surface of concavo-convex layer) of the already formed ink layer in the second and subsequent layers) for each coordinate.

The correction processing unit 1902 corresponds to the correction processing unit 1403 in Embodiment 2. In the correction processing unit 1902 of the present embodiment, the correction processing is performed on each piece of slice data based on the generated distance map. Normally, in a case in which the distance ΔH from the appropriate distance is large, the correction processing is performed by using a filter having a high correction intensity.

Figure 20:
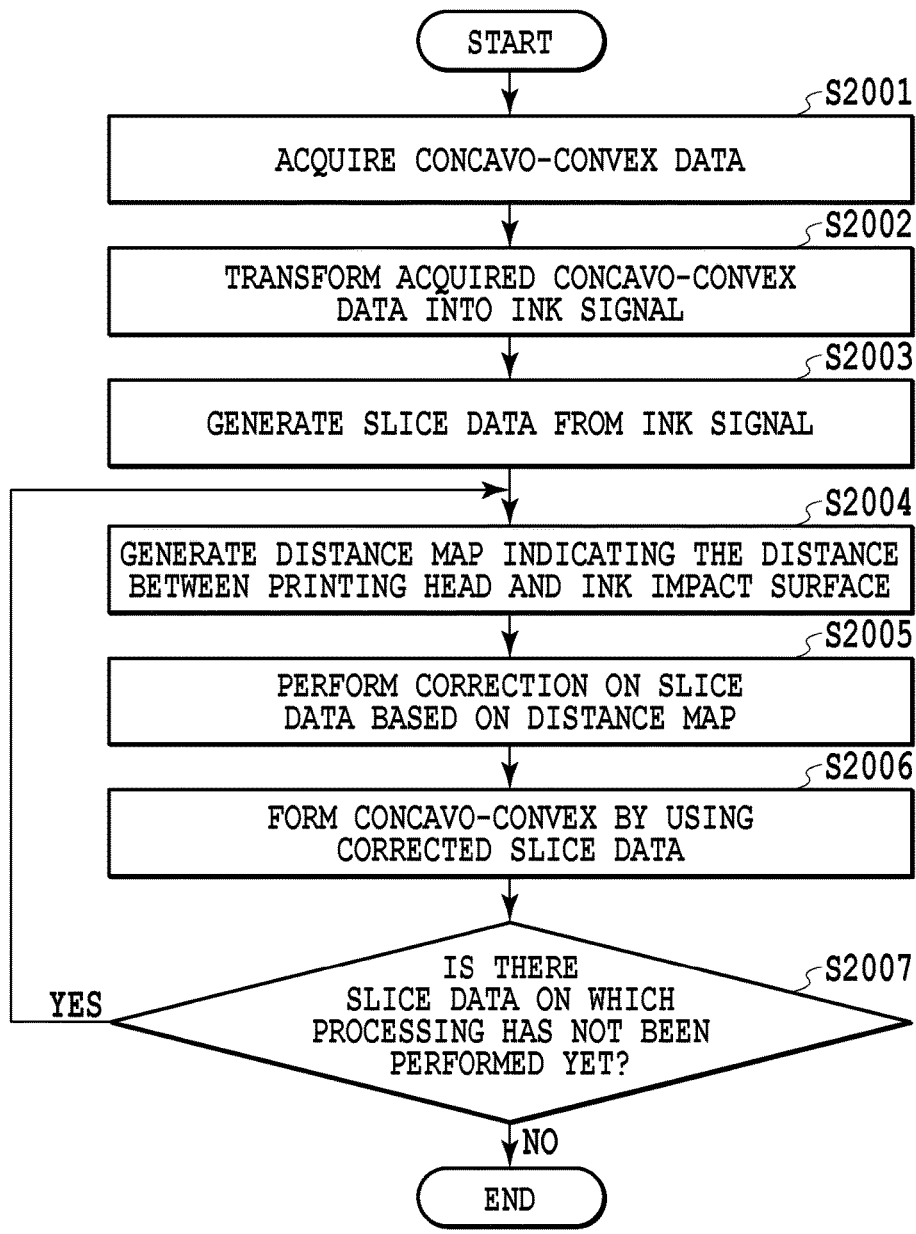
FIG. 20 is a flowchart showing a flow of processing in the control unit.

FIG. 20 is a flowchart showing a flow of the processing in the control unit 120 according to the present embodiment.

At step S2001, the control unit 120 acquires the concavo-convex data I (x, y). The acquired concavo-convex data I (x, y) is sent to the color material signal generation unit 1401.

At step S2002, the color material signal generation unit 1401 transforms the received concavo-convex data into an ink signal. The generated ink signal is sent to the slice data generation unit 1402.

At step S2003, the slice data generation unit 1402 generates the above-described slice data based on the received ink signal. In Embodiment 2, the concavo-convex layer is formed in the order from the slice data in the lowermost layer, and, therefore, the distance from the printing head up to the ink impact surface is substantially fixed during a single scan. In a case in which a certain area is printed by a plurality of scans, however, because of the problem of the accuracy of the ink impact position, making uniform the ink amount to be ejected in each scan is performed frequently rather than concentrating the ink amount to be ejected in a specific scan. This is performed, for example, in a case in which printing a certain pattern by a single scan will result in conspicuous unevenness of the stripe due to the head period, but printing the pattern separately by four scans will make the unevenness seem to be reduced. Further, in a case in which ink is ejected concentratedly in a single scan, the ink sticks to one another and image quality trouble, such as blurring, is likely to occur, and, therefore, from these viewpoints also, making uniform the ink amount to be ejected in each scan is performed frequently. As a result of this problem, it will happen that the height is different for each of the xy coordinates in the subsequent scans and that the distance between the printing head and the impact surface is not fixed. Further, depending on uses, there is a case in which processing to cover the concavo-convex layer by way of coating formation at the end of the concavo-convex layer formation (so-called coating) is performed. In the above-described case, there occurs a state in which the distance between the printing head and the impact surface is not fixed. The present embodiment is effective in the case in which the distribution of the height changes depending on the xy coordinates during a single scan. Because of this, it may be possible to freely exchange the scan numbers of the slice data.

At step S2004, the distance map generation unit 1901 generates the above-described distance map. At this time, the height of the surface of the already formed concavo-convex layer (i.e., the ink droplet impact surface) in the case in which the slice data on which the processing is to be performed is in the second or subsequent layers is derived by adding the values of slice data on which the concavo-convex layer forming processing at step S2006, to be described later, has been completed for each coordinate. It may be possible to find the height of the printing head from the set value, or the like, in the case of, for example, an output apparatus capable of controlling the height of the printing head for each scan, or to use the measured value in the case in which a distance sensor, or the like, is provided. Then, by finding the difference between the derived height of the surface of concavo-convex layer and the height of the printing head for each coordinate, the distance map is generated.

At step S2005, the correction processing unit 1902 performs the correction processing on each coordinate of the slice data of the layer to be formed next by determining a filter that is applied to the slice data based on the difference ΔH (x, y) between the distance map generated at step S2004 and the appropriate distance. At this time, as the MTF characteristics of the filter that is applied, normally filters having a high correction intensity are selected in the case in which the difference ΔH from the appropriate distance is large. The difference ΔH from the appropriate distance from the printing head hardly changes in a range up to a certain distance (in the vicinity of the appropriate distance), but there is a tendency for the characteristics to deteriorate considerably in the case in which the distance becomes greater.

At step S2006, the control unit 120 performs concavo-convex forming processing based on the slice data on which the correction processing has been performed.

At step S2007, the control unit 120 determines whether there is slice data on which the processing has not been performed yet. In a case in which there is slice data on which the processing has not been performed yet, the processing returns to step S2004 and the processing at step S2004 to step S2007 is repeated. On the other hand, in the case in which the concavo-convex layer forming processing has been completed for all the slice data, the present processing is terminated.

Figure 21:
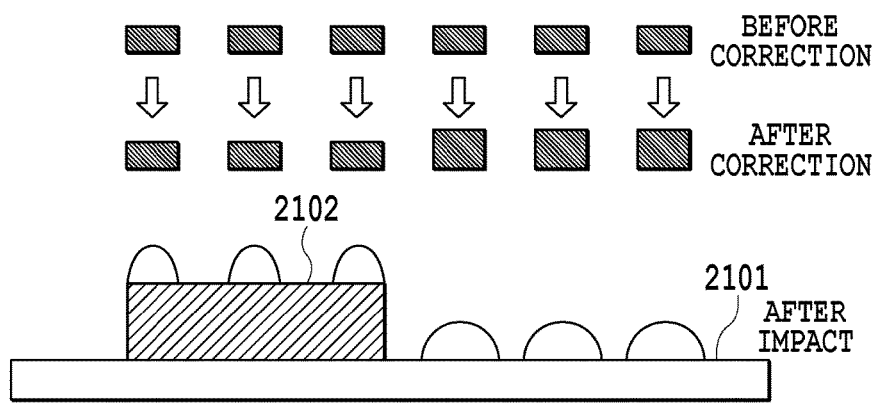
FIG. 21 is a diagram explaining an effect of Embodiment 3.

FIG. 21 is a diagram explaining the effect according to the present embodiment. Here, it is assumed that concavo-convex layer is formed by slice data with the same period and amplitude on the printing medium surface having a difference in distance from the ink droplet impact surface located at the appropriate distance, as previously explained with reference to FIG. 18, is ΔH. In the case of the correction processing according to the present embodiment, a greater correction effect is applied to a printing medium surface 2101 than to a surface 2102 of the ink layer on which the concavo-convex layer has already been formed by the amount corresponding to the difference of the distance ΔH. In the example in FIG. 21, it is made possible to obtain an amplitude having a magnitude that is about the same also on the surface 2102 of the ink layer and on the printing medium surface 2101 for the concavo-convex layer formed after the impact.

Modified Embodiment of Embodiment 3

In the present embodiment, the filter characteristics are changed in accordance with the distance between the printing head and the ink impact surface. As the formation conditions that affect the MTF characteristics of the concavo-convex layer forming apparatus, however, there are various conditions as follows:
(1) an environmental condition, such as temperature and humidity, that affects the ink viscosity, or the like;
(2) an ink condition (color material condition), such as the ink viscosity in a case in which a plurality of inks is used by switching among the plurality of inks;
(3) a printing medium condition that affects permeation and wet spreading of ink; and
(4) an operation condition, such as the drive frequency and moving speed of the printing head, the timing of ultraviolet irradiation (operation timing), and the amount of light (operation intensity).

The above-described printing medium condition includes the characteristics of the surface of the ink having already impacted, in addition to the information on the printing medium to be used.

Figure 22:
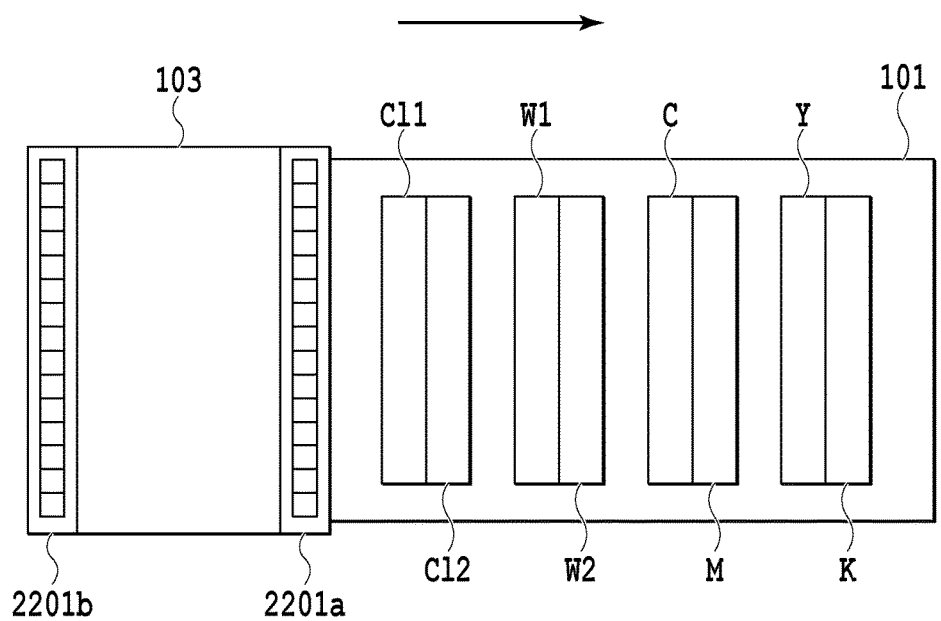
FIG. 22 is an enlarged view of a configuration portion of a head cartridge and an ultraviolet irradiation device.

FIG. 22 is an enlarged view of the configuration portion of the head cartridge 101 and the ultraviolet irradiation device 103 described previously. The head cartridge 101 and the ultraviolet irradiation device 103 are fixed on the carriage 102 (see FIG. 1 described previously), and eject ink and irradiate the ink with ultraviolet light, respectively, while moving in the direction of the arrow in FIG. 22 during a printing scan. The ultraviolet irradiation device 103 includes two light emission parts 2201a and 2201b, and the distance of the light emission part 2201 to the head cartridge 101 is different from the distance of the light emission part 2201b to the head cartridge 101. Because of the different distances to the head cartridge 101, the time that is taken from when ink is ejected until exposure by ultraviolet light is also different between the light emission part 2201a and the light emission part 2201b.

Figure 23A:
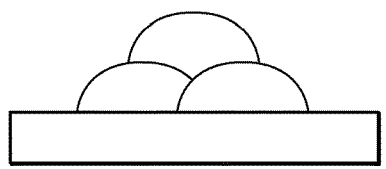
FIG. 23A is a diagram showing how a difference in the time from when ink is ejected until ultraviolet exposure affects the concavo-convex object or image that is formed.
Figure 23B:
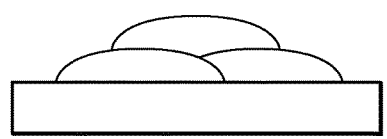
FIG. 23B is a diagram showing how a difference in the time from when ink is ejected until ultraviolet exposure affects the concavo-convex object or image that is formed.

FIG. 23A and FIG. 23B are diagrams showing how the difference in the time that is taken from when ink is ejected until exposure by ultraviolet light affects the concavo-convex layer to be formed. FIG. 23A is a section view of ink droplets in a case in which the time that is taken until exposure is relatively short, and FIG. 23B is a section view of ink droplets in a case in which the time that is taken until exposure is relatively long. Ink droplets ejected from the printing head wet-spread after coming into contact with the top of the printing medium or the ink in the lower layer. In the example in FIG. 23A, the ink hardens before the ink wet-spreads sufficiently widely, and, therefore, a sufficient height is formed. On the other hand, in the example in FIG. 23B, the ink hardens after the ink wet-spreads to a certain extent, and, therefore, a sufficient height is unlikely to be formed. The process shown in FIG. 23B may be used in a case in which it is desired to obtain a shiny appearance on the surface of printed matter.

In a case in which the MTF characteristics change depending on the formation conditions of the concavo-convex layer forming apparatus, as described above, it may also be possible to add the environmental condition, the ink condition, the printing medium condition, and the operation condition for each position, for example, at the time of generating the distance map at step S2004 described above. Due to this, it is made possible to perform more appropriate correction for each position.

Further, it may also be possible to combine the embodiments, such as the case in which the distance map of the present embodiment is made use of in Embodiment 1.

OTHER EMBODIMENTS

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus for controlling a concavo-convex layer forming apparatus, the control apparatus comprising:
   (A) at least one memory that stores instructions; and
   (B) at least one processor coupled to the at least one memory, and configured to execute the instructions to cause the control apparatus to function as:
   (a) an input unit configured to input concavo-convex data representing a three-dimensional object; and
   (b) a correction unit configured to perform correction on the input concavo-convex data in accordance with at least one frequency band of the input concavo-convex data and a filter having an intensity that is made higher for the input concavo-convex data having a greater amplitude on the input concavo-convex data, wherein the concavo-convex layer forming apparatus forms at least one concavo-convex layer on a printing medium based on the corrected concavo-convex data.

2. The control apparatus according to claim 1, wherein the correction unit performs nonlinear correction on the input concavo-convex data based on an amplitude for each frequency band of the at least one frequency band of the input concavo-convex data.

3. The control apparatus according to claim 1, wherein the correction unit performs nonlinear correction on the input concavo-convex data based on a lookup table obtained by measuring frequency response characteristics of the input concavo-convex data in advance.

4. The control apparatus according to claim 1, wherein the at least one processor is further configured to execute the instructions to cause the control apparatus to function as:
   (c) a wavelet transformation concavo-convex data generating unit configured to generate wavelet transformed concavo-convex data for each frequency band, of the at least one frequency band of the input concavo-convex data, by carrying out wavelet transformation on the input concavo-convex data;
   (d) a wavelet inverse transformation concavo-convex data generating unit configured to generate wavelet inverse transformed concavo-convex data, having integrated each frequency band, by carrying out wavelet inverse transformation on the concavo-convex data on which the correction has been performed; and
   (e) a color data generating unit configured to generate data specifying an amount of color material that is to be used for forming at least one concavo-convex layer based on the concavo-convex data, having integrated each frequency band.

5. A control apparatus for controlling a concavo-convex layer forming apparatus having a concavo-convex layer forming unit configured to form at least one concavo-convex layer on a printing medium based on concavo-convex data, the control apparatus comprising:
   (A) at least one memory that stores instructions; and
   (B) at least one processor coupled to the at least one memory, and configured to execute the instructions to cause the control apparatus to function as:
   (a) a dividing unit configured to divide the concavo-convex data into a plurality of pieces of slice data that specify an amount of color material for each scan, of a plurality of scans to be performed by the concavo-convex layer forming unit; and
   (b) a correcting unit configured to correct each piece of slice data based on a formation condition that affects frequency response characteristics of the concavo-convex layer forming unit,
   wherein the concavo-convex layer forming unit forms the at least one concavo-convex layer on the printing medium by performing the plurality of scans based on the plurality of corrected pieces of slice data.

6. The control apparatus according to claim 5, wherein the formation condition is a distance between a printing head of the concavo-convex layer forming unit and an impact surface of a color material.

7. The control apparatus according to claim 6, wherein the correcting unit increases an intensity of the filter used in the correction with an increase in a difference between (i) the distance between the printing head and the impact surface of the color material and (ii) a predetermined appropriate distance.

8. The control apparatus according to claim 5, wherein the formation condition includes at least one of an operation condition, an environmental condition, a color material condition, and a printing medium condition of the concavo-convex layer forming apparatus.

9. The control apparatus according to claim 8, wherein the operation condition includes at least one of a drive frequency of a printing head of the concavo-convex layer forming unit, a moving speed of the printing head, an operation timing of a hardening unit of the concavo-convex layer forming apparatus, and an operation intensity of the hardening unit.

10. The control apparatus according to claim 1, wherein the concavo-convex layer forming apparatus is an inkjet printer.

11. A control method for controlling a concavo-convex layer forming apparatus, which is configured to form at least one concavo-convex layer on a printing medium based on concavo-convex data, using a control apparatus, the control method comprising:
   inputting the concavo-convex data representing a three-dimensional object;
   performing correction on the input concavo-convex data in accordance with at least one frequency band of the input concavo-convex data and a filter having an intensity that is made higher for the input concavo-convex data having a greater amplitude; and
   forming, using the concavo-convex layer forming apparatus, the at least one concavo-convex layer on a printing medium based on the corrected concavo-convex data.

12. A control method for controlling a concavo-convex layer forming apparatus having a concavo-convex layer forming unit configured to form at least one concavo-convex layer on a printing medium based on concavo-convex data, the control method comprising:
 dividing the concavo-convex data into a plurality of pieces of slice data that specify an amount of color material for each scan, of a plurality of scans to be performed by the concavo-convex layer forming unit, the concavo-convex data representing a three-dimensional object;
 correcting each piece of slice data based on a formation condition that affects frequency response characteristics of the concavo-convex layer forming unit; and
 forming the at least one concavo-convex layer on the printing medium by performing the plurality of scans based on the plurality of corrected pieces of slice data.

13. A non-transitory computer readable storage medium storing a program for causing a computer to perform a control method for controlling a concavo-convex layer forming apparatus having a concavo-convex layer forming unit configured to form at least one concavo-convex layer on a printing medium based on concavo-convex data, the control method comprising:
 dividing the concavo-convex data into a plurality of pieces of slice data that specify an amount of color material for each scan, of a plurality of scans to be performed by the concavo-convex layer forming unit, the concavo-convex data representing a three-dimensional object;
 correcting each piece of slice data based on a formation condition that affects frequency response characteristics of the concavo-convex layer forming unit; and
 forming the at least one concavo-convex layer on the printing medium by performing the plurality of scans based on the plurality of corrected pieces of slice data.

14. A non-transitory computer readable storage medium storing a program for causing a computer to perform a control method for controlling a concavo-convex layer forming apparatus by a control apparatus connected to the concavo-convex layer forming apparatus, the control method comprising:
 inputting concavo-convex data representing a three-dimensional object into the control apparatus;
 performing correction on the input concavo-convex data in accordance with at least one frequency band of the input concavo-convex data and a filter having an intensity that is made higher for a greater amplitude of the input concavo-convex data; and
 forming, using the concavo-convex layer forming apparatus, at least one concavo-convex layer on a printing medium based on the corrected concavo-convex data.

* * * * *